(12) United States Patent
Cho et al.

(10) Patent No.: US 12,488,838 B2
(45) Date of Patent: Dec. 2, 2025

(54) MEMORY DEVICE INCLUDING PAGE BUFFER CIRCUIT

(71) Applicant: Samsung Electronics Co., Ltd., Suwon-si (KR)

(72) Inventors: Yongsung Cho, Suwon-si (KR); Inho Kang, Suwon-si (KR); Insu Kim, Suwon-si (KR); Jaehue Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 248 days.

(21) Appl. No.: 18/197,258

(22) Filed: May 15, 2023

(65) Prior Publication Data

US 2024/0055055 A1    Feb. 15, 2024

(30) Foreign Application Priority Data

Aug. 11, 2022   (KR) ........................ 10-2022-0100677

(51) Int. Cl.
    *G11C 7/00*     (2006.01)
    *G11C 11/56*    (2006.01)
    *G11C 16/04*    (2006.01)
    *G11C 16/24*    (2006.01)
    *G11C 16/26*    (2006.01)
    *H01L 23/00*    (2006.01)
    *H01L 25/065*   (2023.01)
    *H10B 80/00*    (2023.01)

(52) U.S. Cl.
    CPC .......... *G11C 16/24* (2013.01); *G11C 11/5642* (2013.01); *G11C 11/5671* (2013.01); *G11C 16/0483* (2013.01); *G11C 16/26* (2013.01); *H01L 24/08* (2013.01); *H01L 25/0657* (2013.01); *H10B 80/00* (2023.02); *H01L 2224/08145* (2013.01); *H01L 2924/1431* (2013.01); *H01L 2924/14511* (2013.01)

(58) Field of Classification Search
    CPC ....... G11C 7/1051; G11C 7/1078; G11C 7/22; G11C 7/106; G11C 7/1057
    USPC .................................................... 365/189.05
    See application file for complete search history.

(56) References Cited

U.S. PATENT DOCUMENTS

| | | | |
|---|---|---|---|
| 7,675,777 B2 | 3/2010 | Lee et al. | |
| 8,243,515 B2 | 8/2012 | Park | |
| 8,300,473 B2 | 10/2012 | Cernea | |
| 10,395,727 B2 | 8/2019 | Yu et al. | |
| 10,529,431 B2 | 1/2020 | Cho | |
| 2020/0357460 A1* | 11/2020 | Yoon ................... G11C 11/4074 |
| 2021/0407597 A1* | 12/2021 | Park ....................... G11C 16/24 |

(Continued)

*Primary Examiner* — Son T Dinh
(74) *Attorney, Agent, or Firm* — Muir Patent Law, PLLC

(57) ABSTRACT

A memory device includes a memory cell array including a plurality of memory cells, and a page buffer circuit including a plurality of page buffer units respectively connected to the plurality of memory cells via a plurality of bit lines, and a plurality of cache latches respectively corresponding to the plurality of page buffer units. Each of the plurality of page buffer units includes a pass transistor that is connected to a corresponding sensing node and is driven according to a pass control signal, and the memory device is configured such that in a data sensing period, a sensing node of a selected page buffer unit among the plurality of page buffer units is actively connected to a sensing node of an unselected page buffer unit among the plurality of page buffer units.

20 Claims, 20 Drawing Sheets

(56) References Cited

U.S. PATENT DOCUMENTS

2022/0020404 A1 1/2022 Cho et al.
2022/0051729 A1 2/2022 Cho et al.

* cited by examiner

MEMORY DEVICE INCLUDING PAGE BUFFER CIRCUIT

CROSS-REFERENCE TO RELATED APPLICATIONS

This application is based on and claims priority under 35 U.S.C. § 119 to Korean Patent Application No. 10-2022-0100677, filed on Aug. 11, 2022, in the Korean Intellectual Property Office, the disclosure of which is incorporated by reference herein in its entirety.

BACKGROUND

The present disclosure relates to a memory device, and more particularly, to a memory device including a page buffer circuit.

Along with the recent trend of multi-functionality of information communication devices, the demand for large capacity and high integration of memory devices has emerged. A memory device may include a page buffer for storing data in memory cells or outputting data from memory cells, and the page buffer may include semiconductor devices such as transistors.

SUMMARY

Aspects of the inventive concept provide a memory device in which a plurality of program states are identified by adjusting a length of a developing period.

According to an aspect of the inventive concept, a memory device includes a memory cell array including a plurality of memory cells, and a page buffer circuit including a plurality of page buffer units respectively connected to the plurality of memory cells via a plurality of bit lines, and a plurality of cache latches respectively corresponding to the plurality of page buffer units. Each of the plurality of page buffer units includes a pass transistor that is connected to a corresponding sensing node and is driven according to a pass control signal, and the memory device is configured such that in a data sensing period, a sensing node of a selected page buffer unit among the plurality of page buffer units is actively connected to a sensing node of an unselected page buffer unit among the plurality of page buffer units.

According to another aspect of the inventive concept, a memory device includes a memory cell array including a plurality of memory cells, and a page buffer circuit including N page buffer units connected to the plurality of memory cells via N respective bit lines, wherein N is a natural number less than or equal to 8, and N cache latches respectively corresponding to the N page buffer units. The memory device is configured such that, in a data sensing period, a sensing node of a first page buffer unit sensing data stored in at least one memory cell among the plurality of memory cells among the N page buffer units is actively electrically connected to a sensing node of at least a second page buffer unit other than the first page buffer unit among the N page buffer units.

According to another aspect of the inventive concept, a memory device includes a memory cell region including a plurality of memory cells and a first metal pad, and a peripheral circuit region including a second metal pad and being vertically connected to the memory cell region through the first metal pad and the second metal pad, wherein the peripheral circuit region includes a page buffer circuit including a plurality of page buffer units arranged in a first horizontal direction and respectively connected to the plurality of memory cells via a plurality of bit lines, and a plurality of cache latches arranged in the first horizontal direction and respectively corresponding to the plurality of page buffer units. The memory device is configured such that, in a data sensing period, a sensing node of a first page buffer unit sensing data stored in at least one memory cell among the plurality of memory cells among the plurality of page buffer units is actively electrically connected to a sensing node of at least a second page buffer unit from among the plurality of page buffer units.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments of the inventive concept will be described more fully with reference to the accompanying drawings.

Figure 1:
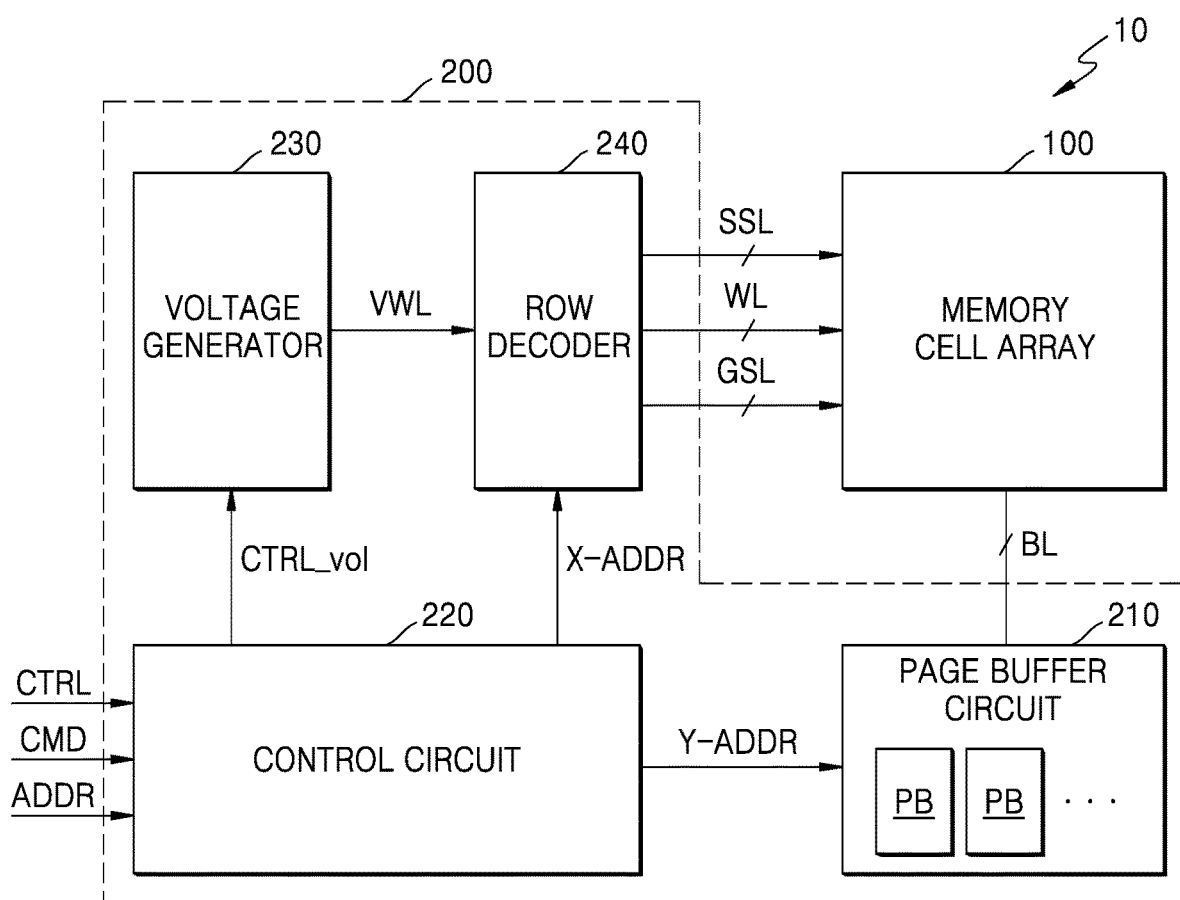
FIG. 1 is a block diagram illustrating a memory device according to an embodiment.

FIG. 1 is a block diagram illustrating a memory device 10 according to an embodiment.

Referring to FIG. 1, the memory device 10 may include a memory cell array 100 and a peripheral circuit 200, and the peripheral circuit 200 may include a page buffer circuit 210, a control circuit 220, a voltage generator 230, and a row decoder 240. Although not illustrated in FIG. 1, the peripheral circuit 200 may further include a data input/output circuit or an input/output interface. In addition, the peripheral circuit 200 may further include column logic, a pre-decoder, a temperature sensor, a command decoder, an address decoder, and the like.

The memory cell array 100 may be connected to the page buffer circuit 210 through bit lines BL, and may be connected to the row decoder 240 through word lines WL, string selection lines SSL, and ground selection lines GSL. The memory cell array 100 may include a plurality of memory cells, which, for example, may be flash memory cells. Hereinafter, embodiments of the inventive concept in which a plurality of memory cells are NAND flash memory cells will be described as an example. However, the inventive concept is not limited thereto, and in some embodiments, the plurality of memory cells may be resistive memory cells such as resistive RAM (ReRAM), phase change RAM (PRAM), or magnetic RAM (MRAM).

In an embodiment, the memory cell array 100 may include a three-dimensional memory cell array, and the three-dimensional memory cell array may include a plurality of NAND strings, and each NAND string may include memory cells respectively connected to word lines that are vertically disposed on a substrate, which will be described in detail with reference to FIGS. 3 and 4. U.S. Patent Publication No. 7,679,133, U.S. Patent Publication No. 8,553,466, U.S. Patent Publication No. 8,654,587, U.S. Patent Publication No. 8,559,235, and U.S. Patent Application Publication No. 2011/0233648 disclose suitable configurations of a three-dimensional memory array in which the three-dimensional memory array is configured in a plurality of levels, and word lines and/or bit lines are shared between the levels, and are incorporated herein by reference in their entireties. However, the inventive concept is not limited thereto, and in some embodiments, the memory cell array 100 may include a two-dimensional memory cell array, and the two-dimensional memory cell array may include a plurality of NAND strings arranged along row and column directions.

Based on a command CMD, an address ADDR and a control signal CTRL, the control circuit 220 may program data into the memory cell array 100, read data from the memory cell array 100, or output various control signals for erasing data stored in the memory cell array 100, for example, a voltage control signal CTRL_vol, a row address X-ADDR, and a column address Y-ADDR. Accordingly, the control circuit 220 may generally control various operations in the memory device 10. Accordingly, the control circuit 220 may be configured to perform the various steps and control the various control signals described below in connection with memory device 10, and relating, for example, to the sensing operations described herein. In certain embodiments, the control circuit 220 includes various logic and processing circuits, and may further include firmware and/or programmable code, configured to perform the various steps and control the various control signals described below in connection with memory device 10.

The voltage generator 230 may generate various types of voltages to perform program, read, and erase operations on the memory cell array 100 based on the voltage control signal CTRL_vol. In detail, the voltage generator 230 may generate a word line voltage VWL, for example, a program voltage, a read voltage, a pass voltage, an erase verification voltage, or a program verification voltage. Also, the voltage generator 230 may further generate a string selection line voltage and a ground selection line voltage based on the voltage control signal CTRL_vol.

The row decoder 240 may select one of a plurality of memory blocks in response to a row address X-ADDR, and may select one of word lines WL of the selected memory block, and select one of string selection lines SSL of the selected memory block. The page buffer circuit 210 may select some of the bit lines BL in response to a column address Y-ADDR. In detail, the page buffer circuit 210 operates as a write driver or a sense amplifier according to an operation mode.

A plurality of memory cells (e.g., 16 KB memory cells) may be connected to one word line, and according to a read operation mode, data from some of the plurality of memory cells connected to the one word line may be read. For example, in a 4 KB read operation mode, 4 KB data may be read from 16 KB memory cells, and in an 8 KB read operation mode, 8 KB data may be read from 16 KB memory cells.

The page buffer circuit 210 may include a plurality of page buffers PB respectively connected to the plurality of bit lines BL. In the present embodiment, page buffer units (e.g., PBU0 to PBUn of FIG. 5) included in each of the plurality of page buffers PB, and cache latches included in each of the plurality of page buffers PB (e.g., CL0 to CLn of FIG. 5) may be spaced apart from each other, thus being in a separated structure. Each page buffer unit may be connected to one bit line. According to a read operation mode, only some of the page buffer units (e.g., PBU0 to PBUn of FIG. 5) included in one page buffer PB may perform a sensing operation through a sensing node. For example, among eight page buffer units (e.g., first to eighth page buffer units PBU0 to PBU7 of FIG. 12) included in one page buffer PB, only two page buffers (for example, the fourth and eighth page buffer units PBU3 and PBU7 of FIG. 12) may perform a sensing operation through fourth and eighth sensing nodes SO3 and SO7. A page buffer unit performing a sensing operation may be referred to as a selected page buffer unit, and a page buffer unit that does not perform a sensing operation may be referred to as an unselected page buffer unit.

In a data sensing period, a sensing node of a selected page buffer unit and a sensing node of at least one of unselected page buffer units may be electrically connected to each other. By the unselected page buffer unit being electrically connected, the capacitance of the sensing node of the selected page buffer unit may increase. As used herein, components described as being "electrically connected" or "communicatively connected" are configured such that an electrical signal can be transferred from one component to the other (although such electrical signal may be attenuated in strength as it is transferred and may be selectively transferred). Moreover, components that are "directly electrically connected" share a common electrical node through electrical connections by one or more conductors, such as, for example, wires, pads, internal electrical lines, through vias, etc. As such, directly electrically connected components do not include components electrically connected through active elements, such as transistors or diodes. Two components described as "actively connected" or "actively electrically connected" have a configuration (e.g., are in a selectable state) that allows a signal or voltage to pass from one component to the other. For example, such components may have different states, and in one state, they are actively connected, and an another state, they are not actively connected (or are actively disconnected) so that a signal does not pass from one component to the other. An example of two actively connected components are two components connected through a switch (e.g., a transistor) that is in an on state. An example of two components that are not actively connected is two components connected through a switch that is off.

Due to the increased capacitance, a plurality of program states may be precisely distinguished by adjusting a length of a developing period even if the level of a read voltage applied to a word line is not adjusted.

Figure 2:
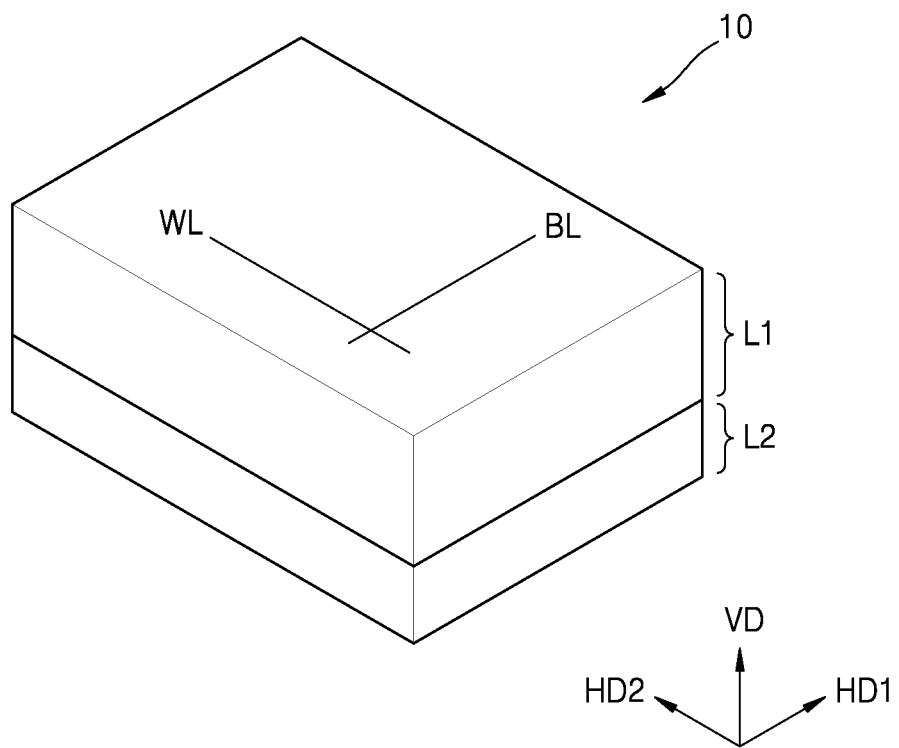
FIG. 2 is a schematic view of a structure of the memory device of FIG. 1 according to an embodiment.

FIG. 2 is a schematic view of a structure of the memory device 10 of FIG. 1 according to an embodiment. Referring to FIG. 2, the memory device 10 may include a first semiconductor layer L1 and a second semiconductor layer L2, and the first semiconductor layer L1 may be stacked in a vertical direction VD with respect to the second semiconductor layer L2. In detail, the second semiconductor layer L2 may be disposed under the first semiconductor layer L1 in the vertical direction VD, and thus the second semiconductor layer L2 may be disposed relatively close to a substrate.

In an embodiment, the memory cell array 100 of FIG. 1 may be formed in the first semiconductor layer L1, and the peripheral circuit 200 of FIG. 1 may be formed in the second semiconductor layer L2. Accordingly, the memory device 10 may have a structure in which the memory cell array 100 is disposed over the peripheral circuit 200, that is, a cell over peripheral (COP) structure. The COP structure may effectively reduce a horizontal area and improve the degree of integration of the memory device 10.

In an embodiment, the second semiconductor layer L2 may include a substrate, and by forming, on the substrate, transistors and metal patterns for wiring the transistors, the peripheral circuit 200 may be formed in the second semiconductor layer L2. After the peripheral circuit 200 is formed in the second semiconductor layer L2, the first semiconductor layer L1 including the memory cell array 100 may be formed, and metal patterns for electrically connecting the word lines WL and the bit lines BL to the peripheral circuit 200 formed in the second semiconductor layer L2 may be formed. For example, the bit lines BL may extend in a first horizontal direction HD1, and the word lines WL may extend in a second horizontal direction HD2.

As the number of stages of memory cells arranged in the memory cell array 100 increases, for example, as the number of stacked word lines WL increases along with the development of semiconductor processes, the area of the memory cell array 100 is reduced, and accordingly, the area of the peripheral circuit 200 is also reduced. According to the present embodiment, in order to reduce the area occupied by the page buffer circuit 210, the page buffer circuit 210 has a structure in which a page buffer unit and a cache latch are separated from each other, and sensing nodes respectively included in page buffer units may be connected in common to a coupling sensing node.

According to the present embodiment, as a sensing node of a selected page buffer unit and a sensing node of an unselected page buffer unit are connected to each other, the capacitance of the sensing node of the selected page buffer unit may increase, and a plurality of program states may be precisely classified by the increased capacitance.

Figure 3:
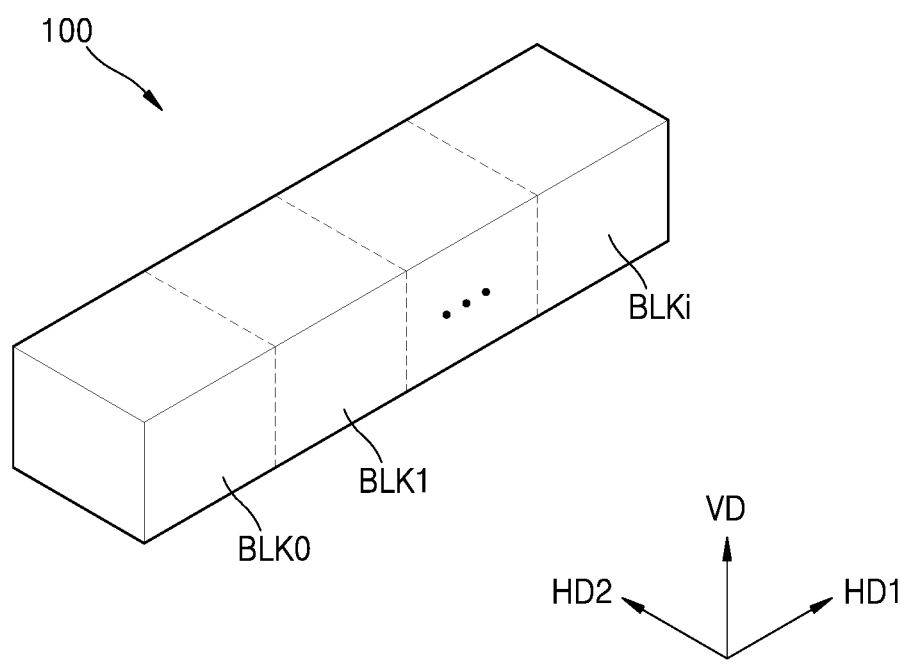
FIG. 3 illustrates an example of a memory cell array of FIG. 1 according to an embodiment.

FIG. 3 illustrates an example of the memory cell array 100 of FIG. 1 according to an embodiment. Referring to FIG. 3, the memory cell array 100 may include a plurality of memory blocks BLK0 to BLKi, and (i) may be a positive integer. Each of the plurality of memory blocks BLK0 to BLKi may have a three-dimensional structure (or a vertical structure). In detail, each of the plurality of memory blocks BLK0 to BLKi may include a plurality of NAND strings extending in the vertical direction VD. The plurality of NAND strings may be provided apart from each other by a certain distance along the first and second horizontal directions HD1 and HD2. The plurality of memory blocks BLK0 to BLKi may be selected by the row decoder 240 of FIG. 1. For example, the row decoder 240 may select a memory block corresponding to a block address from among the plurality of memory blocks BLK0 to BLKi.

Figure 4:
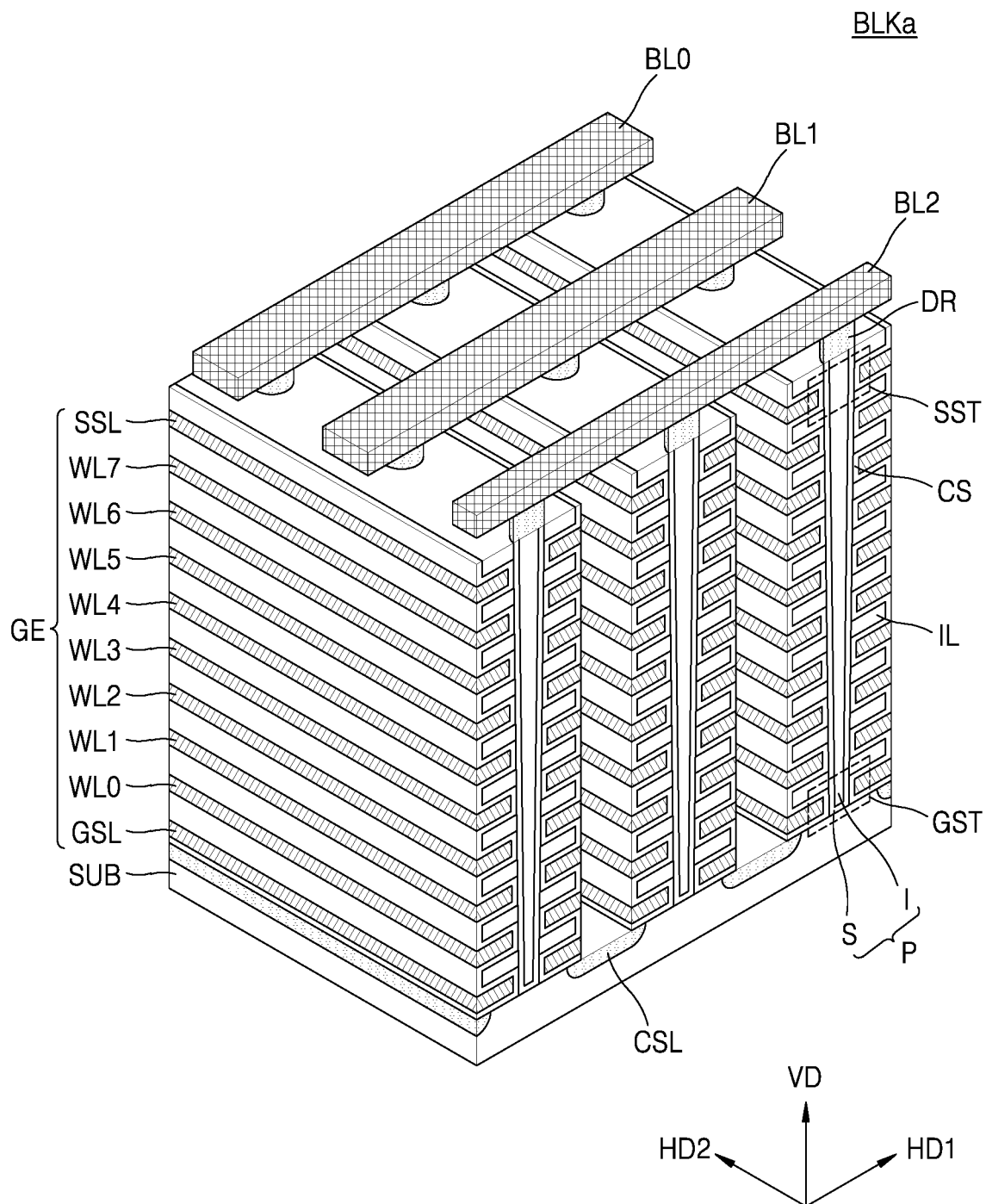
FIG. 4 is a perspective view of a memory block of FIG. 3 according to an embodiment.

FIG. 4 is a perspective view of the memory block BLKa of FIG. 3, according to an embodiment.

Referring to FIG. 4, the memory block BLKa is formed in a vertical direction with respect to a substrate SUB. The substrate SUB includes a common source line CSL that has a first conductivity type (e.g., p-type), extends along the second horizontal direction HD2 on the substrate SUB, and is doped with impurities of a second conductivity type (e.g., n-type). A plurality of insulating layers IL extending along the second horizontal direction HD2 are sequentially provided along the vertical direction VD on a region of the substrate SUB between two adjacent common source lines CSL, and the plurality of insulating layers IL are spaced apart from each other by a certain distance in the vertical direction VD. For example, the plurality of insulating layers IL may include or be formed of an insulating material such as silicon oxide.

A plurality of pillars P that are sequentially disposed along the first horizontal direction HD1 and pass through the plurality of insulating layers IL along the vertical direction VD are provided on the region of the substrate SUB between two adjacent common source lines CSL. For example, the plurality of pillars P may pass through the plurality of insulating layers IL to contact the substrate SUB. In detail, a surface layer S of each pillar P may include a first type silicon material and function as a channel region. An inner layer I of each pillar P may include an insulating material such as silicon oxide or an air gap.

In the region between two adjacent common source lines CSL, a charge storage layer CS is provided along the exposed surfaces of the insulating layers IL, the pillars P, and the substrate SUB. The charge storage layer CS may include a gate insulating layer (also referred to as a 'tunneling insulating layer'), a charge trapping layer, and a blocking insulating layer. For example, the charge storage layer CS may have an oxide-nitride-oxide (ONO) structure. In addition, in the region between the two adjacent common source lines CSL, a gate electrode GE such as a ground selection line GSL and a string selection line SSL and word lines WL0 to WL7 is provided on an exposed surface of the charge storage layer CS.

Drains or drain contacts DR are provided on the plurality of pillars P, respectively. For example, the drains or drain contacts DR may include or be formed of a silicon material doped with impurities having the second conductivity type. Bit lines BL1 to BL3 that extend in the first horizontal direction HD1 and are arranged apart from each other by a certain distance in the second horizontal direction HD2 are provided on the drains DR.

Figure 5:
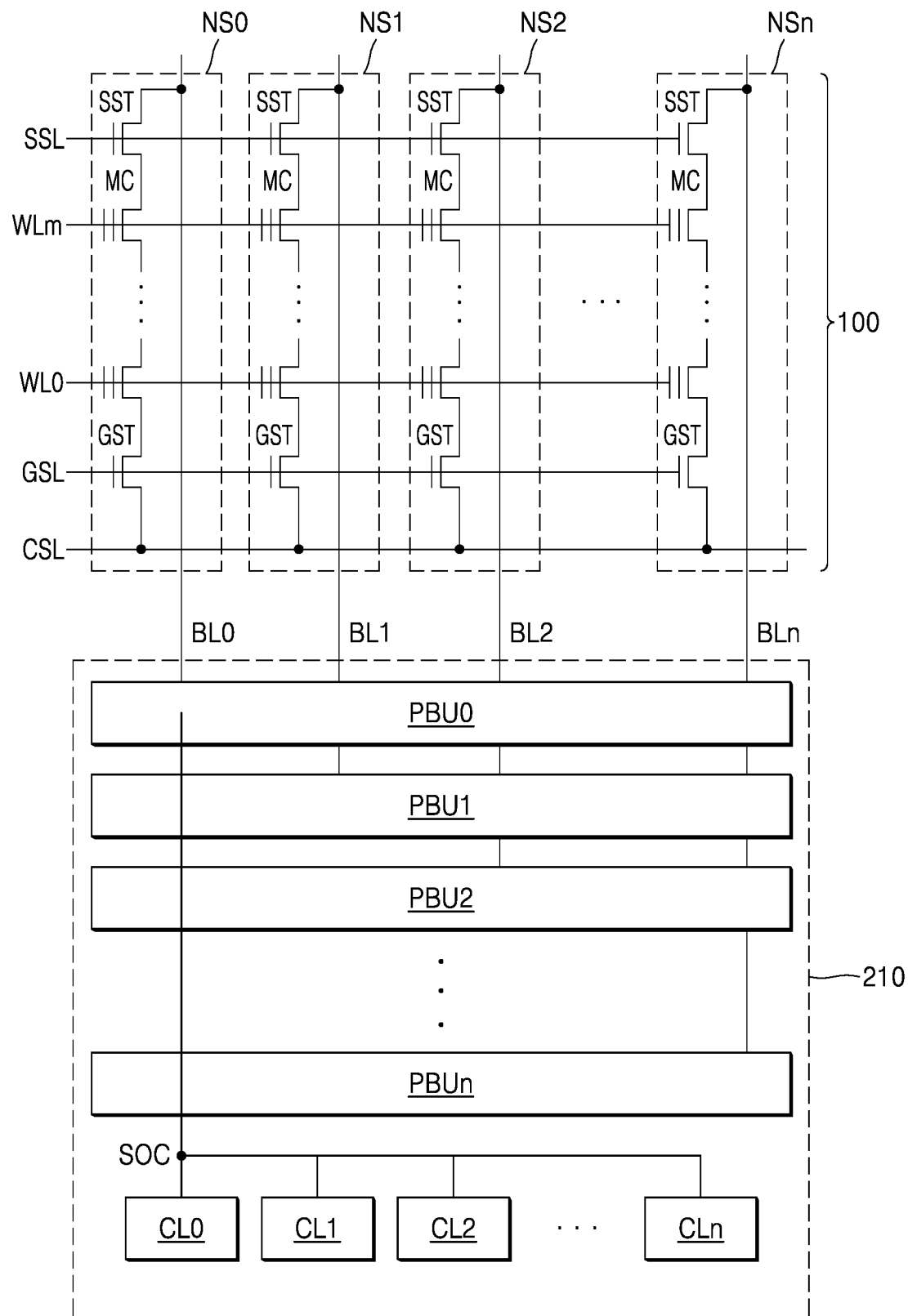
FIG. 5 illustrates an example of a connection between a memory cell array and a page buffer circuit, according to an embodiment.

FIG. 5 illustrates an example of connection between the memory cell array 100 and the page buffer circuit 210, according to an embodiment.

Referring to FIG. 5, the memory cell array 100 may include first to n+1th NAND strings NS0 to NSn, and each of the first to n+1th NAND strings NS0 to NSn may include a ground select transistor GST connected to the ground selection line GSL, a plurality of memory cells MC respectively connected to a plurality of word lines WL0 to WLm, and a string select transistor SST connected to the string selection line SSL, and the ground select transistor GST, the plurality of memory cells MC, and the string select transistor SST may be connected to each other in series. Here, m is a positive integer.

The page buffer circuit 210 may include first to n+1th page buffer units PBU0 to PBUn. The first page buffer unit PBU0 may be connected to the first NAND string NS0 through a first bit line BL0, and the n+1th page buffer unit PBUn may be connected to the n+1-th NAND string NSn through an n+1th bit line BLn. Here, n is a positive integer. For example, n may be 7, and the page buffer circuit 210 may have a structure in which page buffer units PBU0 to PBUn of eight stages are arranged in a line. For example, the first to n+1th page buffer units PBU0 to PBUn may be arranged in a line along an extension direction of the first to n+1th bit lines BL0 to BLn.

The page buffer circuit 210 may further include first to n+1th cache latches CL0 to CLn respectively corresponding to the first to n+1th page buffer units PBU0 to PBUn. For example, n may be 7, and the page buffer circuit 210 may have a structure in which cache latches CL0 to CLn of eight stages are arranged in a line. For example, the first to n+1th cache latches CL0 to CLn may be arranged in a line along the extension direction of the first to n+1th bit lines BL0 to BLn.

Sensing nodes of the first to n+1th page buffer units PBU0 to PBUn may be connected in common to a coupling sensing node SOC. Also, the first to n+1th cache latches CL0 to CLn may be commonly connected to the coupling sensing node SOC. Accordingly, the first to n+1th page buffer units PBU0 to PBUn may be connected to the first to n+1th cache latches CL0 to CLn through the coupling sensing node SOC.

Figure 6:
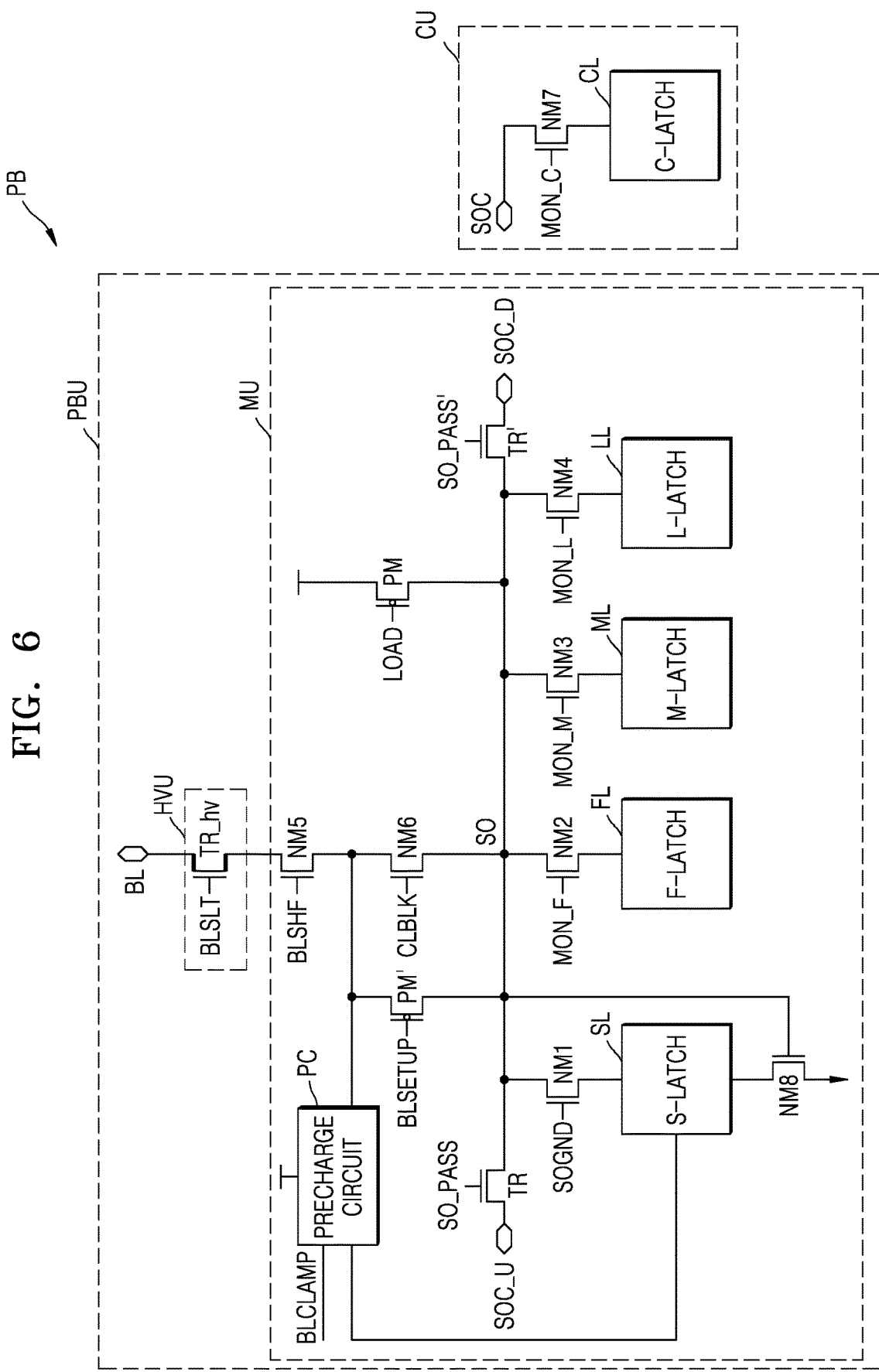
FIG. 6 is a detailed view of a page buffer according to an embodiment.

FIG. 6 is a detailed view of the page buffer PB according to an embodiment.

Referring to FIG. 6, the page buffer PB may correspond to the example of the page buffer PB of FIG. 1. The page buffer PB may include a page buffer unit PBU and a cache unit CU. As the cache unit CU includes a cache latch (C-LATCH) CL, and the cache latch CL is connected to the data input/output line, the cache unit CU may be disposed adjacent to a data input/output line. Accordingly, the page buffer unit PBU and the cache unit CU may be disposed apart from each other, and the page buffer PB may have a structure in which the page buffer unit PBU and the cache unit CU are separated from each other.

The page buffer unit PBU may include a main unit MU. The main unit MU may include main transistors in the page buffer PB. The page buffer unit PBU may further include a bit line select transistor TR_hv connected to the bit line BL and driven by the bit line select signal BLSLT. The bit line select transistor TR_hv may be implemented as a high-voltage transistor, and accordingly, the bit line select transistor TR_hv may be located in a well region different from the main unit MU, that is, in a high voltage unit HVU.

The main unit MU may include a sensing latch (S-LATCH) SL, a force latch (F-LATCH) FL, a higher bit latch (M-LATCH) ML, and a lower bit latch (L-LATCH) LL. According to an embodiment, the sensing latch SL, the force latch FL, the higher bit latch ML, or the lower bit latch LL may be referred to as a "main latch". The main unit MU may further include a precharge circuit PC capable of controlling a precharge operation on the bit line BL or a sensing node SO based on a bit line clamping control signal BLCLAMP, and further include a transistor PM' driven by a bit line setup signal BLSETUP. The transistor PM' may precharge the sensing node SO to a precharge level in a precharge period.

The sensing latch SL may store data stored in a memory cell or a sensing result of a threshold voltage of the memory cell during a read or program verify operation. Also, the sensing latch SL may be used to apply a program bit line voltage or a program prohibit voltage to the bit line BL during a program operation. The force latch FL may be used to improve threshold voltage distribution during a program operation. In detail, the force latch FL stores force data. The force data may be initially set to '1' and then inverted to '0' when a threshold voltage of a memory cell enters a forcing region that is less than a target region. By using the force data, a bit line voltage may be controlled during the program execution operation and a relatively narrow program threshold voltage distribution may be formed.

The higher bit latch ML, the lower bit latch LL, and the cache latch CL may be utilized to store data input from the outside during a program operation, and may be referred to as a "data latch". When 3-bit data is programmed in one memory cell, 3-bit data may be stored in each of the higher bit latch ML, the lower bit latch LL, and the cache latch CL. Until programming of the memory cell is completed, the higher bit latch ML, the lower bit latch LL, and the cache latch CL may retain stored data. In addition, the cache latch CL may receive data read from the memory cell during a read operation from the sensing latch SL and output the data to the outside through the data input/output line.

Also, the main unit MU may further include first to fourth transistors NM1 to NM4. The first transistor NM1 may be connected between the sensing node SO and the sensing latch SL, and may be driven by a ground control signal SOGND. The second transistor NM2 may be connected between the sensing node SO and the force latch FL, and may be driven by a force monitoring signal MON_F. The third transistor NM3 may be connected between the sensing node SO and the higher bit latch ML, and may be driven by a higher bit monitoring signal MON_M. The fourth transistor NM4 may be connected between the sensing node SO and the lower bit latch LL and may be driven by a lower bit monitoring signal MON_L.

In addition, the main unit MU may further include fifth and sixth transistors NM5 and NM6 connected in series between the bit line selection transistor TV_hv and the sensing node SO. The fifth transistor NM5 may be driven by a bit line shut-off signal BLSHF, and the sixth transistor NM6 may be driven by a bit line connection control signal CLBLK. Also, the main unit MU may further include a precharge transistor PM. The precharge transistor PM may be connected to the sensing node SO, driven by a load signal LOAD, and may precharge the sensing node SO to a precharge level in the precharge period.

In the present embodiment, the main unit MU may further include a pair of pass transistors connected to the sensing node SO, that is, first and second pass transistors TR and TR'. According to an embodiment, the first and second pass transistors TR and TR' may be referred to as "first and second sensing node connection transistors". The first and second pass transistors TR and TR' may be driven according to first and second sensing node pass control signals SO_PASS1 and SO_PASS'. According to an embodiment, the first sensing node pass control signal SO_PASS may be referred to as a "first sensing node connection control signal", and the second sensing node pass control signal SO_PASS' may be referred to as a "second sensing node connection control signal". The first sensing node pass control signal SO_PASS and the second sensing node pass control signal SO_PASS' may have different logic levels from each other. For example, the first sensing node pass control signal SO_PASS may have a high level, and the second sensing node pass control signal SO_PASS' may have a low level. In detail, the first pass transistor TR may be connected between a first terminal SOC_U and the sensing node SO, and the second pass transistor TR' may be connected between the sensing node SO and a second terminal SOC_D.

For example, when the page buffer unit PBU is the second page buffer unit PBU1 of FIG. 5, the first terminal SOC_U may be connected to one end of a pass transistor included in the first page buffer unit PBU0, and the second terminal SOC_D may be connected to one end of a pass transistor included in the third page buffer unit PBU3. Accordingly, the sensing node SO may be electrically connected to the coupling sensing node SOC through pass transistors respectively included in the third to n+1th page buffer units PBU2 to PBUn.

The page buffer PB verifies whether programming of a selected memory cell is completed among memory cells included in a NAND string connected to the bit line BL during a program operation. In detail, the page buffer PB stores, in the sensing latch SL, data sensed through the bit line BL, during a program verification operation. The higher bit latch ML and the lower bit latch LL, in which target data is stored, are set according to the sensed data stored in the sensing latch SL. For example, when the sensed data indicates that programming is completed, the higher bit latch ML and the lower bit latch LL are switched to a program inhibit setting for a selected memory cell in a subsequent program loop. The cache latch CL may temporarily store input data provided from the outside. During a program operation, target data stored in the cache latch CL may be stored in the higher bit latch ML and the lower bit latch LL.

The main unit MU may further include an eighth transistor NM8 connected to the sensing latch SL. The eighth transistor NM8 may provide a discharge path to the sensing latch SL according to the level of the sensing node SO. That is, when the level of the sensing node SO is higher than a threshold voltage level of the eighth transistor NM8, a discharge path may be provided to the sensing latch SL. In some embodiments of the inventive concept, a threshold voltage of the eighth transistor NM8 may be referred to as a sensing trip Sensing_Trip. The sensing trip Sensing Trip may be referred to as a reference level.

Figure 7:
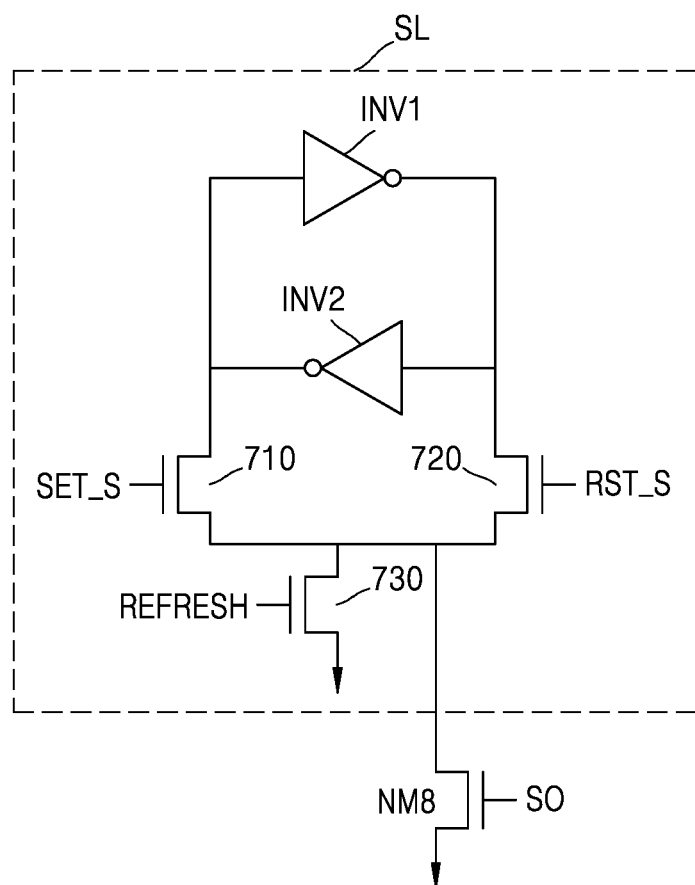
FIG. 7 is a circuit diagram of a sensing latch according to an embodiment.

FIG. 7 is a circuit diagram of the sensing latch SL according to an embodiment.

Referring to FIG. 7, the sensing latch SL may include a first inverter INV1, a second inverter INV2, and transistors 710, 720, and 730.

An output end of the first inverter INV1 may be connected to an input end of the second inverter INV2, and an input end of the first inverter INV1 may be connected to an output end of the second inverter INV2, so that the first and second inverters INV1, INV2 may act as a latch.

The transistor 710 may be connected to the input end of the first inverter INV1, and the transistor 720 may be connected to the input end of the second inverter INV2. A set signal SET_S may be provided to a gate terminal of the transistor 710, and a reset signal RST_S may be provided to a gate terminal of the transistor 720. As the level of the sensing node SO is sensed according to an activation timing of the set signal SET_S or the reset signal RST_S, data may be stored in a latch.

For example, when the level of the sensing node SO is greater than the level of the sensing trip, the eighth transistor NM8 is turned on, and thus, when the set signal SET_S transitions to a high level, '0' may be stored in the input end of the first inverter INV1. Conversely, when the level of the sensing node SO is less than the level of the sensing trip, the eighth transistor NM8 is turned off, and thus, when the set signal SET_S transitions to a high level, existing data may be maintained at the input end of the first inverter INV1.

The transistor 730 may be used to change or initialize data stored in a latch. A refresh signal REFRESH may be provided to a gate terminal of the transistor 730. When the transistor 730 is turned on by the refresh signal REFRESH and the transistor 720 is turned on by the reset signal RST_S, '1' may be stored at the input end of the first inverter INV1.

Figure 8:
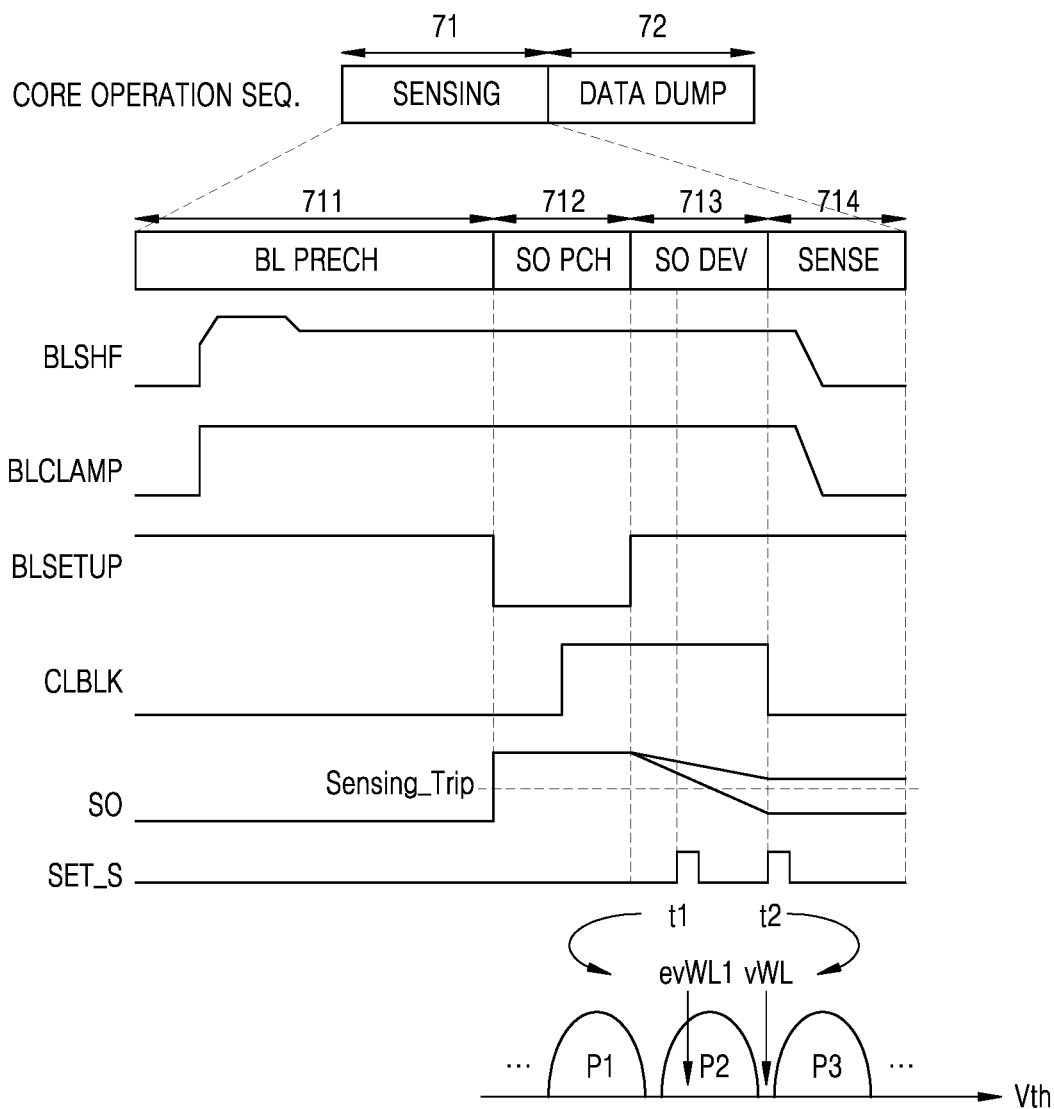
FIG. 8 is a timing diagram for describing a core operation sequence according to an embodiment.

FIG. 8 is a timing diagram for describing a core operation sequence according to an embodiment.

Referring to FIGS. 6 and 8 together, the core operation sequence represents the operation of the page buffer PB. For example, the core operation sequence may include a data sensing period 71 in which a data sensing operation is performed, and data dumping period or a data transfer period 72 in which a data dumping operation is performed.

The data sensing period 71 may include a bit line precharge period 711 in which the operation of precharging the voltage of the bit line BL to the precharge level is performed, a sensing node precharge period 712 in which an operation of precharging the voltage of the sensing node SO to the precharge level is performed, a developing period 713 in which an operation of developing the voltage of the sensing node SO by electrically connecting the bit line BL to the sensing node SO is performed, and a sensing period 714 in which an operation of sensing the voltage of the sensing node SO is performed.

In the bit line precharge period 711, a bit line may be precharged based on the bit line shut off signal BLSHF and the bit line clamping control signal BLCLAMP.

In the sensing node precharge period 712, the sensing node SO may be precharged based on the bit line setup signal BLSETUP.

In the developing period 713, the voltage level of the sensing node SO may decrease based on the bit line setup signal BLSETUP and the bit line connection control signal CLBLK. In detail, as a cell current flows from the sensing node SO to the bit line BL, the voltage level of the sensing node SO may decrease. A plurality of memory cells connected to a word line may be respectively connected to a plurality of page buffer units through a plurality of bit lines. When a read voltage is applied to the word line, cell currents flowing through the plurality of bit lines may vary according to a program state of the plurality of memory cells, and the voltage drop (e.g., a total voltage drop and rate of the voltage drop) of a sensing node may vary among the page buffer units.

In the sensing period 714, as data obtained by comparison between the level of a corresponding sensing node and the level of a sensing trip may be stored in each of sensing latches included in the plurality of page buffer units, a plurality of memory cells connected to the word line to which the read voltage is applied may be distinguished as on-cells and off-cells. For example, at a second time t2, a set signal SET_S may be applied to each of the sensing latches included in the plurality of page buffer units, and thus, the plurality of memory cells connected to a word line to which a read voltage vWL is applied, may be distinguished as a second program state P2 or a third program state P3.

In some embodiments, a length of the developing period 713 may be adjusted, for example, by being terminated by the first time t1, the length of the developing period 713 may be shortened. Even when the length of the developing period 713 is shortened, it is assumed that the read voltage applied to the word line is equal as vWL. As the set signal SET_S is applied to each of the sensing latches included in first to eighth page buffer units PBU0 to PBU7, at a first time t1, the sensing period 714 may arrive. Due to the shortened length of the developing period 713, in order to lower the level of the sensing node SO to be lower than the level of the sensing trip, that is, to flip data to the sensing latch SL, a relatively large cell current may be required. That is, when the read voltage is equal as vWL, the memory cell with a low threshold voltage may flip data of the sensing latch SL, and thus, the effect of lowering an effective read voltage from vWL to evWL1 may be obtained.

However, when the magnitude of a maximum cell current is limited, even when the length of the developing period 713 is shortened, there may be a limit to the degree to which the voltage level of the sensing node SO is lowered. Accordingly, a drop in the effective read voltage required to distinguish different program states (e.g., a first program state P1) may not occur. For example, even when the length of the developing period 713 is shortened, the first program state P1 and the second program state P2 may not be distinguished from each other by the effective read voltage evWL1.

Figure 9:
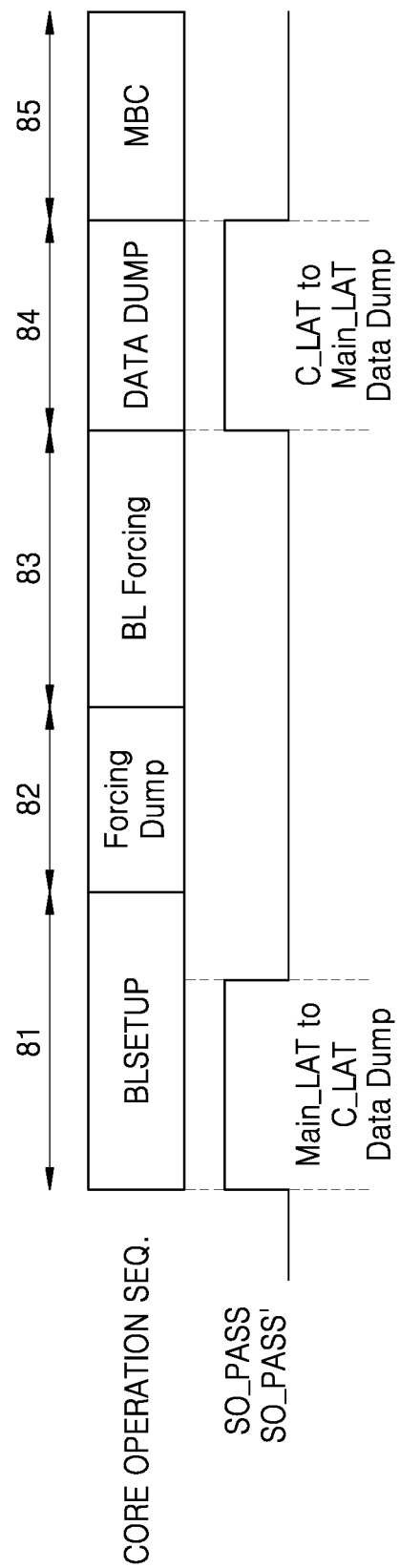
FIG. 9 is a timing diagram illustrating another example of a voltage level of a sensing node pass control signal according to a core operation sequence, according to an embodiment.

FIG. 9 is a timing diagram illustrating another example of a voltage level of the first sensing node pass control signal SO_PASS according to a core operation sequence, according to an embodiment.

Referring to FIGS. 6 and 9 together, the core operation sequence represents the operation of the page buffer PB, for example, the core operation sequence may include a bit line setup period 81, a forcing dumping period 82, a bit line forcing period 83, a data transfer period or data dumping period 84, and a Mass Bit Count (MBC) period 85.

In the bit line setup period 81, the first and second sensing node pass control signals SO_PASS and SO_PASS' may be activated, and the first and second pass transistors TR and TR' may be turned on. At this time, as the sensing node SO is electrically connected to the coupling sensing node SOC, data may be dumped from a main latch included in the page buffer unit PBU (e.g., the sensing latch SL, the force latch FL, the higher bit latch ML, or the lower bit latch LL) to the cache latch CL.

In the forcing dumping period 82 and the bit line forcing period 83, the first and second sensing node pass control signals SO_PASS and SO_PASS' may be deactivated, and the first and second pass transistors TR, TR' may be turned off. Accordingly, the page buffer unit PBU may not be electrically connected to the cache unit CU and may not be electrically connected to adjacent page buffer units, either. In the forcing dumping period 82, when executing a program, a dumping operation for selecting a bit line to force with a lower bias than a power voltage level may be performed. For example, data may be dumped from the force latch FL to the sensing latch SL. In the bit line forcing period 83, during the execution of a program, a voltage applied to the bit line BL may be varied according to a value stored in the force latch FL.

In the data transfer period 84, the first and second sensing node pass control signals SO_PASS and SO_PASS' may be activated, and the first and second pass transistors TR and TR' may be turned on. For example, in the data transfer period 84, an operation of marking, as logic low, data stored in the sensing latch SL connected to memory cells that have failed as a result of the program verification among memory cells to be programmed to a target program state when the program is executed may be performed. As the sensing node SO and the coupled sensing node SOC are electrically connected to each other here, data may be dumped from the cache latch CL to the main latch (e.g., the sensing latch SL).

In the mass bit count period 85, the first and second sensing node pass control signals SO_PASS and SO_PASS' may be deactivated, and the first and second pass transistors TR and TR' may be turned off. Accordingly, the page buffer unit PBU may not be electrically connected to the cache unit CU and may not be electrically connected to adjacent page buffer units. In the mass bit counting period 85, the number of sensing latches marked as logic low previously in the data transfer period 84 may be counted.

Figure 10:
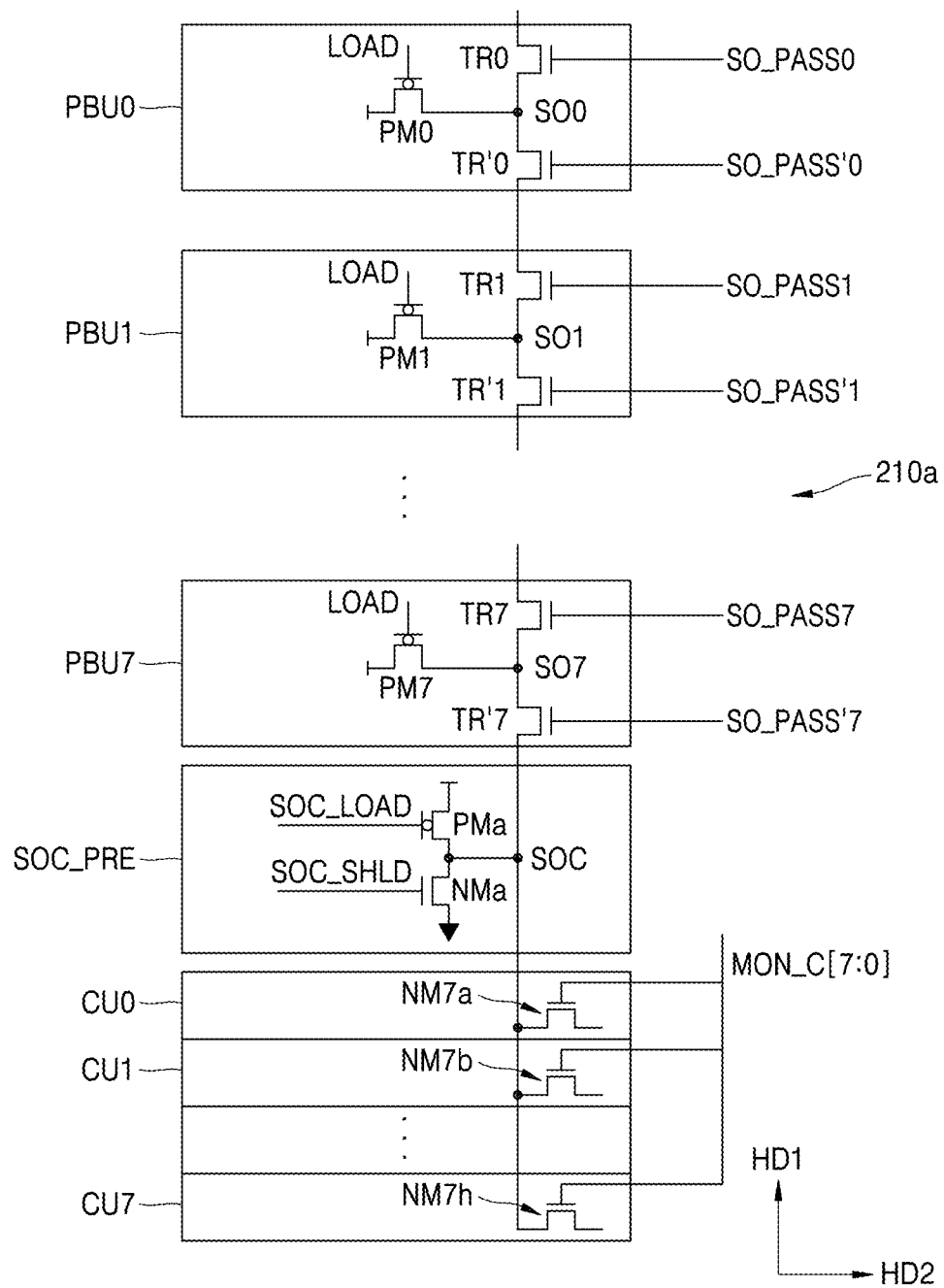
FIG. 10 is a circuit diagram illustrating a page buffer circuit according to an embodiment.

FIG. 10 is a circuit diagram illustrating a page buffer circuit 210a according to an embodiment.

The page buffer circuit 210a may include first to eighth page buffer units PBU0 to PBU7. For example, the page buffer circuit 210a may have an 8-stage structure. However, the embodiments are not limited thereto, and the page buffer circuit 210a may have an N-stage structure, where N is a natural number equal to or less than 8.

Each page buffer unit may include two pass transistors, and accordingly, the page buffer circuit 210a may include sixteen pass transistors TR0, TR'0 to TR7, TR'7, and the sixteen pass transistors TR0, TR'0 to TR7, TR'7 may be connected in series. For example, the first page buffer unit PBU0 may include first and second pass transistors TR0 and TR'0 connected in series.

The first page buffer unit PBU0 may further include, between the first pass transistor TR0 and the second pass transistor TR'0, a plurality of transistors arranged in the first horizontal direction HD1 (e.g., transistors included in the sensing latch SL, the force latch FL, the higher bit latch ML, and the lower bit latch LL and first to sixth and eighth transistors NM1 to NM6 and NM8, etc. of FIG. 6). Hereinafter, the configuration of the first page buffer unit PBU0 will be mainly described, and each of the second to eighth page buffer units PBU1 to PBU7 may have substantially the same configuration as the first page buffer unit PBU0.

A source of the first pass transistor TR0 may be connected to a first terminal (e.g., SOC_U in FIG. 6), and a drain of the first pass transistor TR0 may be connected to a first sensing node SO0. A first sensing node pass control signal SO_PASS0 may be applied to a gate of the first pass transistor TR0. A source of the second pass transistor TR'0 may be connected to the first sensing node SO0, and a drain of the second pass transistor TR'0 may be connected to a second terminal (e.g., SOC_D in FIG. 6). A second sensing node pass control signal SO_PASS'0 may be applied to a gate of the second pass transistor TR'0. The first and second pass transistors TR0 and TR'0 may be connected in series, and the first sensing node SO0 may be formed between the first and second pass transistors TR0 and TR'0.

The second page buffer unit PBU1 may include a first pass transistor TR1 and a second pass transistor TR'1. The first pass transistor TR1 and the second pass transistor TR'0 may be connected in series. The first sensing node pass control signal SO_PASS1 may be applied to a gate of the first pass transistor TR1, and the second sensing node pass control signal SO_PASS'1 may be applied to a gate of the second pass transistor TR'1. The first and second pass transistors TR1 and TR'1 may be connected in series, and a second sensing node SO1 may be formed between the first and second pass transistors TR1 and TR'1.

The eighth page buffer unit PBU7 may include a first pass transistor TR7 and a second pass transistor TR'7. The first sensing node pass control signal SO_PASS7 may be applied to a gate of the first pass transistor TR7, and the second sensing node pass control signal SO_PASS'7 may be applied to a gate of the second pass transistor TR'7. The first and second pass transistors TR7 and TR'7 may be connected in series, and the eighth sensing node SO7 may be formed between the first and second pass transistors TR7 and TR'7.

As the first pass transistors TR[0:7] and the second pass transistors TR'[0:7] are selectively turned on, the first to eighth sensing nodes SO0 to SO7 may be electrically connected to each other (e.g., actively connected to each other) or electrically insulated from each other (e.g., actively disconnected from each other). For example, as the second pass transistor TR'0 and the first pass transistor TR1 are turned on, the first sensing node SO0 and the second sensing node SO1 may be electrically connected to each other (e.g., actively connected to each other).

According to an embodiment, in a data sensing period of a selected page buffer unit, a sensing node of the selected page buffer unit may be electrically connected to (e.g., actively connected to) a sensing node of an unselected page buffer unit. For example, when the first page buffer unit PBU0 is the selected page buffer unit, the first sensing node SO0 may be electrically connected to (e.g., actively connected to) at least one of the second to eighth sensing nodes SO1 to SO7. Accordingly, the capacitance of the first sensing node SO0 may increase, and due to the increased capacitance, even when the level of a read voltage applied to a word line is not adjusted, a plurality of program states may be precisely distinguished by adjusting the length of a developing period.

The first cache unit CU0 may include a monitor transistor NM7a. For example, the monitor transistor NM7a may correspond to the transistor NM7 of FIG. 6. A source of the monitor transistor NM7a may be connected to the coupling sensing node SOC, and a cache monitoring signal MON_C [7:0] may be applied to a gate of the monitor transistor NM7a. Although not shown, the first cache unit CU0 may further include a plurality of transistors disposed along the first horizontal direction HD1 (e.g., a plurality of transistors included in the cache latch CL of FIG. 6). Each of the second to eighth cache units CU1 to CU7 may have substantially the same configuration as the first cache unit CU0. The monitor transistors NM7a to NM7h included in the first to eighth cache units CU0 to CU7, respectively may be connected in common and in parallel to the coupling sensing node SOC. In detail, a source of each of the monitor transistors NM7a to NM7h may be connected in common to the coupling sensing node SOC.

According to the present embodiment, when the first and second sensing node pass control signals SO_PASS[7:0], SO_PASS'[7:0] are activated, the first and second pass transistors TR0 to TR7 and TR0' to TR'7 are turned on, and accordingly, the first and second pass transistors TR0 to TR'7 included in the first to eighth page buffer units PBU0 to PBU7, respectively, may be connected to each other in series, and the first to eighth sensing nodes SO0 to SO7 may be all connected to the coupling sensing node SOC.

The first to eighth page buffer units PBU0 to PBU7 may further include precharge transistors PM0 to PM7, respectively. In the first page buffer unit PBU0, the precharge transistor PM0 may be connected between the first sensing node SO0 and a voltage terminal, to which the precharge level is applied, and may have a gate to which the load signal LOAD is applied. The precharge transistor PM0 may precharge the first sensing node SO0 to a precharge level in response to the load signal LOAD.

The page buffer circuit 210a may further include a precharge circuit SOC_PRE between the eighth page buffer unit PBU7 and the first cache unit CU0. The precharge circuit SOC_PRE may include a precharge transistor PMa and a shielding transistor Nma for precharging the coupling sensing node SOC. The precharge transistor Pma is driven by a coupling sensing node load signal SOC_LOAD, and when the precharge transistor Pma is turned on, the coupling sensing node SOC may be precharged to a precharge level. The shielding transistor Nma is driven by a coupling sensing node shielding signal SOC_SHLD, and when the shielding transistor Nma is turned on, the coupling sensing node SOC may be discharged to a ground level.

Figure 11:
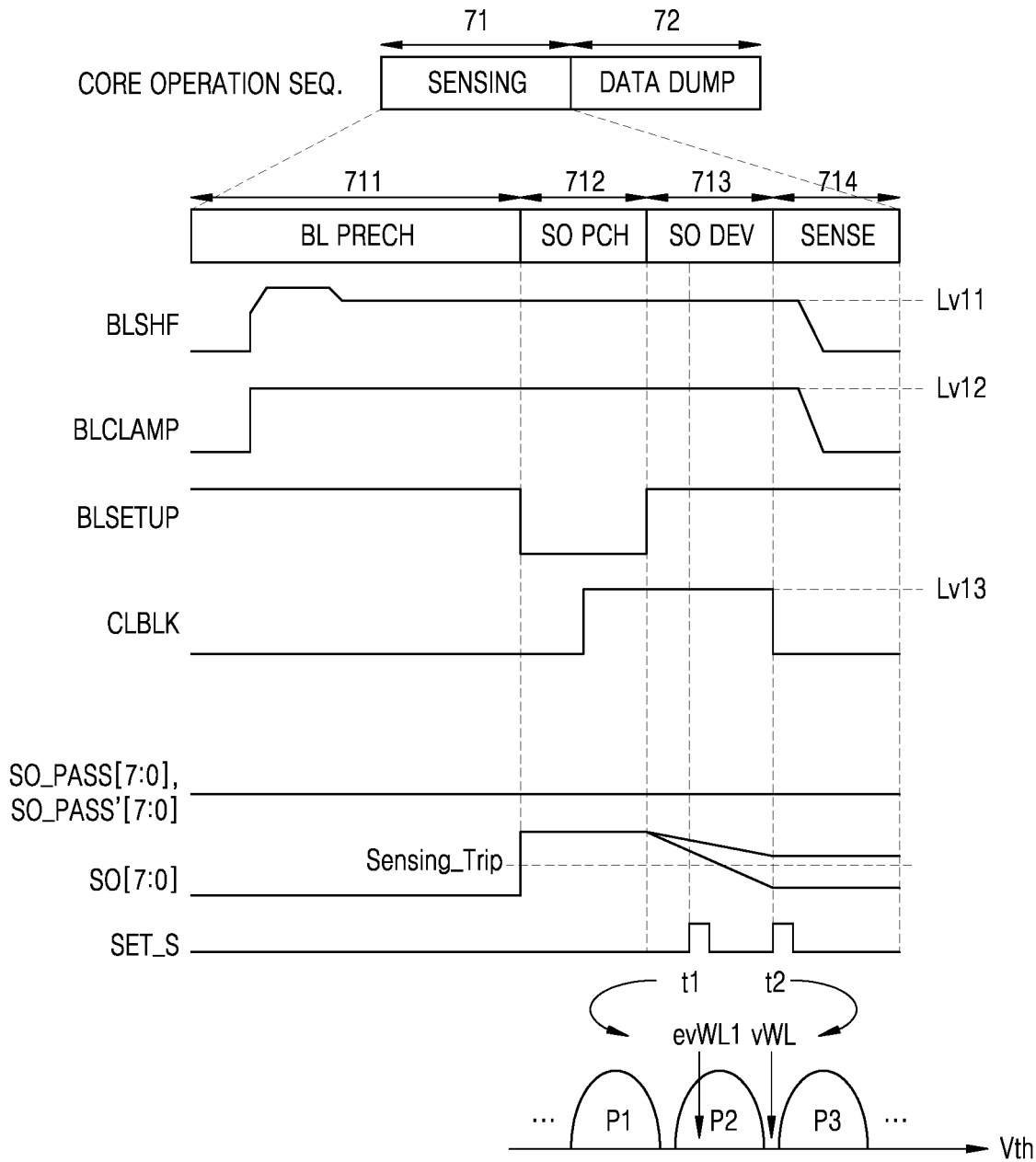
FIG. 11 is a timing diagram for describing a 16 KB read operation mode according to an embodiment.

FIG. 11 is a timing diagram for describing a 16 KB read operation mode according to a comparative embodiment. FIG. 11 will be described below with reference to FIGS. 8 and 10.

A plurality of memory cells (e.g., 16 KB memory cells) may be connected to one word line, and in the 16 KB read operation mode, the first to eighth page buffer units PBU0 to PBU7 of FIG. 10 may all be selected page buffer units. Although only the page buffer circuit 210a is illustrated in FIG. 10, page buffer circuits having substantially the same structure as the page buffer circuit 210a may operate simultaneously with the page buffer circuit 210a during a read operation. Data output by the page buffer circuits operating simultaneously may be 16 KB, 8 KB, 4 KB, 2 KB, or 1 KB.

In the data sensing period 71 of FIG. 11, the bit line shut-off signal BLSHF, the bit line clamping signal BLCLAMP, the bit line setup signal BLSETUP, and the bit line connection control signal CLBLK may be applied in common to all of the first to eighth page buffer units PBU0 to PBU7.

In the data sensing period 71, each of the first to eighth sensing nodes SO0 to SO7 may be developed by a corresponding bit line, and after the developing period is terminated, data according to the levels of the first to eighth sensing nodes SO0 to SO7 may be stored in sensing latches (e.g., SL of FIG. 6) in the first to eighth page buffer units PBU0 to PBU7. In order to reduce mutual interference between the first to eighth sensing nodes SO0 to SO7, in the data sensing period 71, the first to eighth sensing nodes SO0 to SO7 may not be electrically (e.g., actively) connected to each other. Accordingly, both the first pass transistors TR0 to TR7 and the second pass transistors TR'0 to TR'7 may be turned off.

Referring to FIG. 11, in order to turn off all of the first pass transistors TR0 to TR7 and the second pass transistors TR'0 to TR'7, the first and second sensing node pass control signals SO_PASS[7:0], SO_PASS'[7:0] may maintain a low level. FIG. 11 illustrates that the first and second sensing node pass control signals SO_PASS[7:0], SO_PASS'[7:0] are maintained at a low level in the entire data sensing period 71, but the embodiment is not limited thereto. For example, the first and second sensing node pass control signals SO_PASS[7:0] and SO_PASS'[7:0] may maintain a low level only in some periods of the data sensing period 71.

In the data sensing period 71, the bit line shut-off signal BLSHF may rise to a level Lv11, the bit line clamping signal BLCLAMP may rise to a level Lv12, and the bit line connection control signal CLBLK may rise to a level Lv13.

In some embodiments, a length of the developing period 713 may be adjusted, for example, the length of the developing period 713 may be shortened by being terminated by the first time t1. Even when the length of the developing period 713 is shortened, it is assumed that a read voltage applied to a word line is equal to vWL. As the set signal SET_S is applied to each of the sensing latches included in the first to eighth page buffer units PBU0 to PBU7, at the first time t1, the sensing period 714 may arrive. Due to the shortened length of the developing period 713, in order to lower the level of the sensing node SO to be lower than the level of the sensing trip, that is, to flip data to the sensing latch SL, a relatively large cell current may be required. For example, when the read voltage is equal to vWL, and the length of the developing period 713 is shortened, data of the sensing latch SL may be flipped based on a memory cell of a relatively low threshold voltage, and thus, the effect of lowering an effective read voltage from vWL to ewWL1 may be obtained.

However, when the magnitude of a maximum cell current is limited, even when the length of the developing period 713 is shortened, there may be a limit to the degree to which the voltage level of the sensing node SO is lowered. Accordingly, a drop in the effective read voltage required to distinguish different program states (e.g., the first program state P1) may not occur. For example, as illustrated in FIG. 11, even when the length of the developing period 713 is shortened, the first program state P1 and the second program state P2 may not be distinguished from each other by the effective read voltage evWL1.

Figure 12:
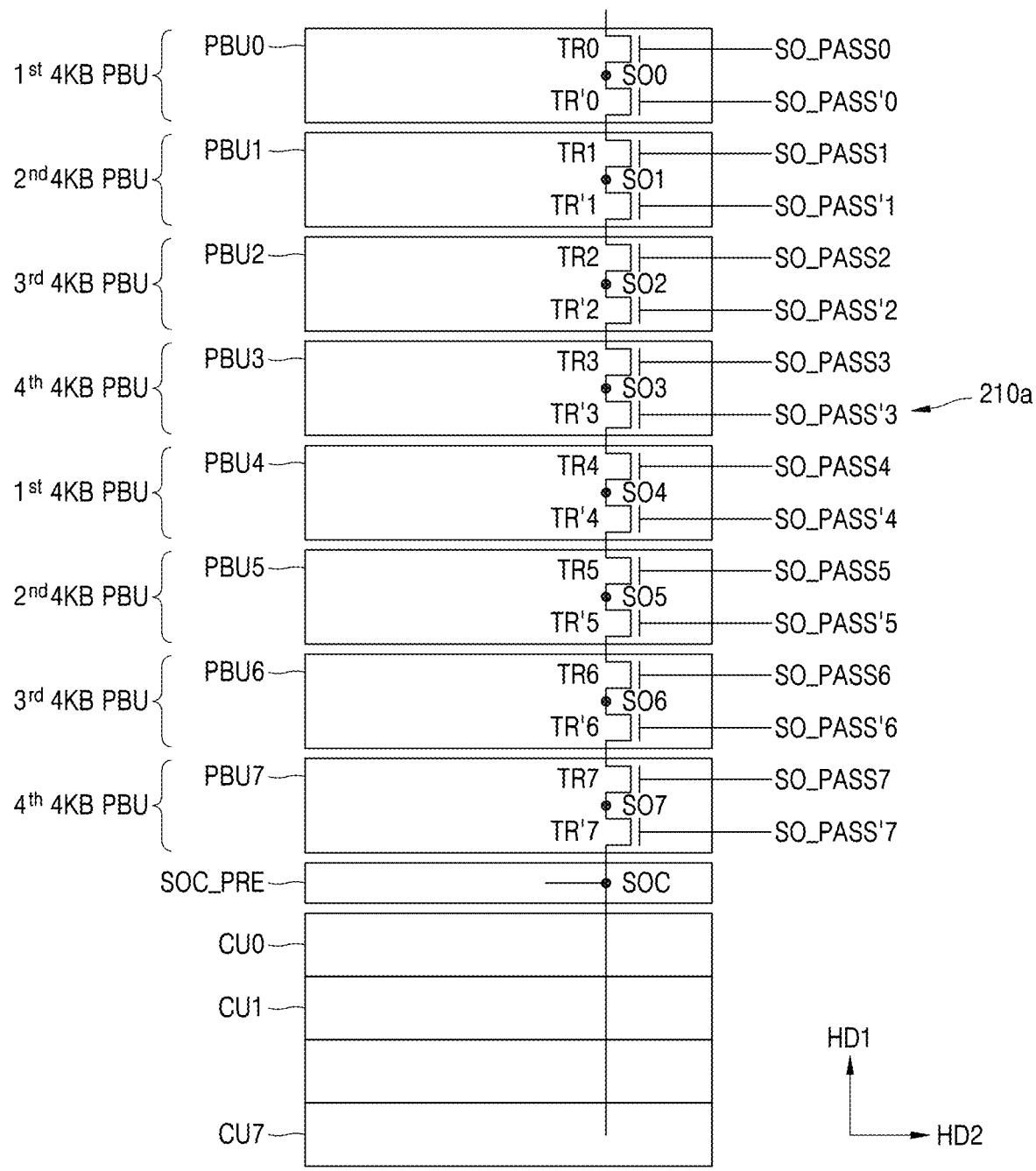
FIG. 12 is a circuit diagram illustrating a page buffer circuit according to an embodiment.
Figure 13A:
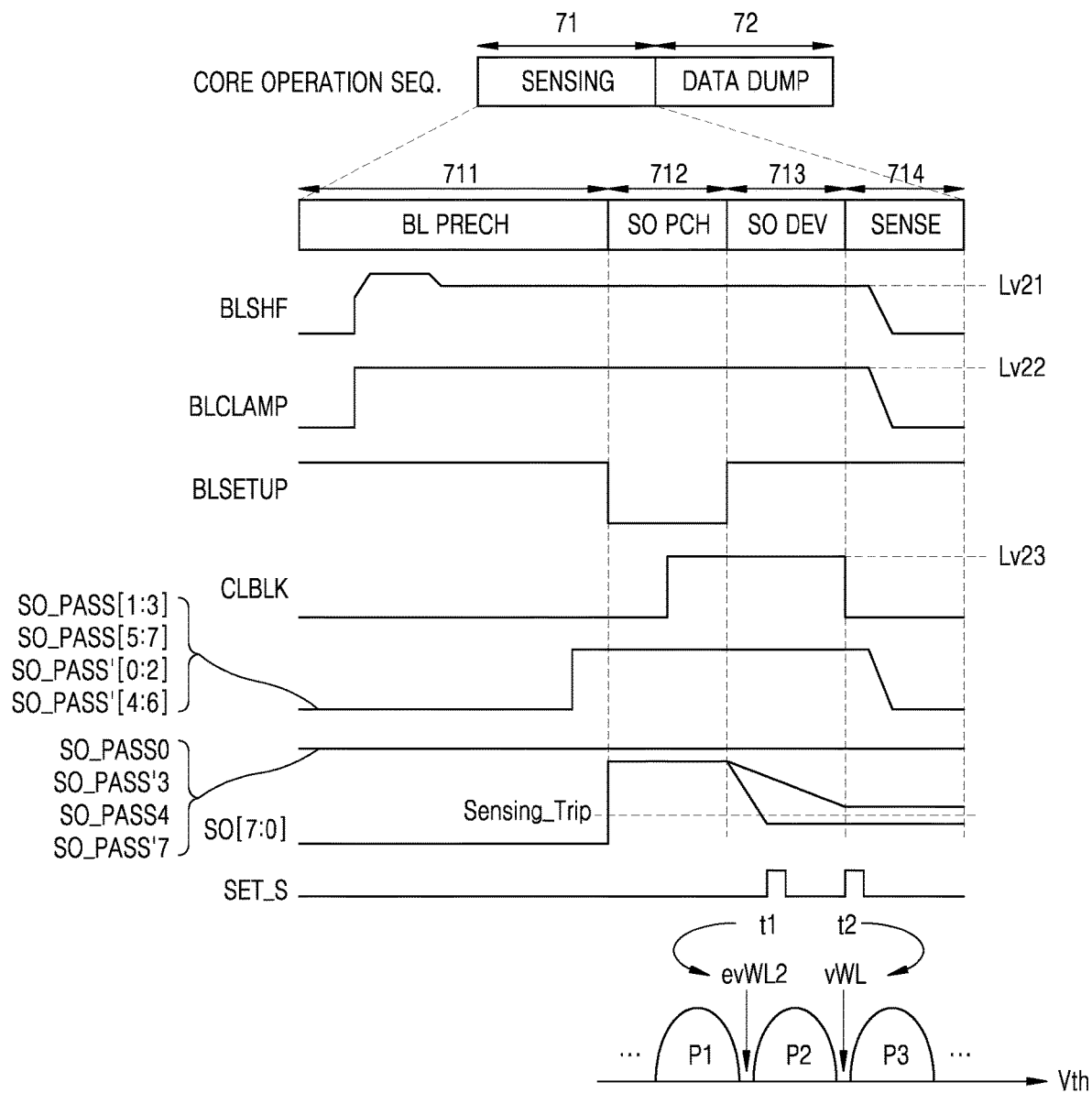
FIG. 13A is a timing diagram for describing a 4 KB read operation mode according to an embodiment.
Figure 13B:
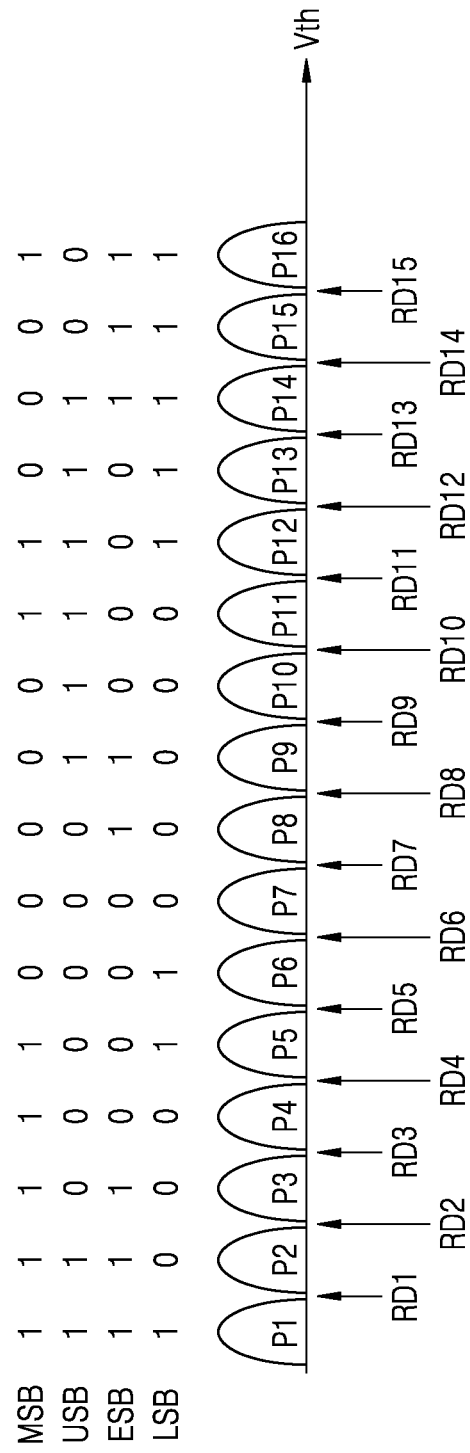
FIG. 13B is a timing diagram for describing a program state of a QLC program operation.
Figure 13C:
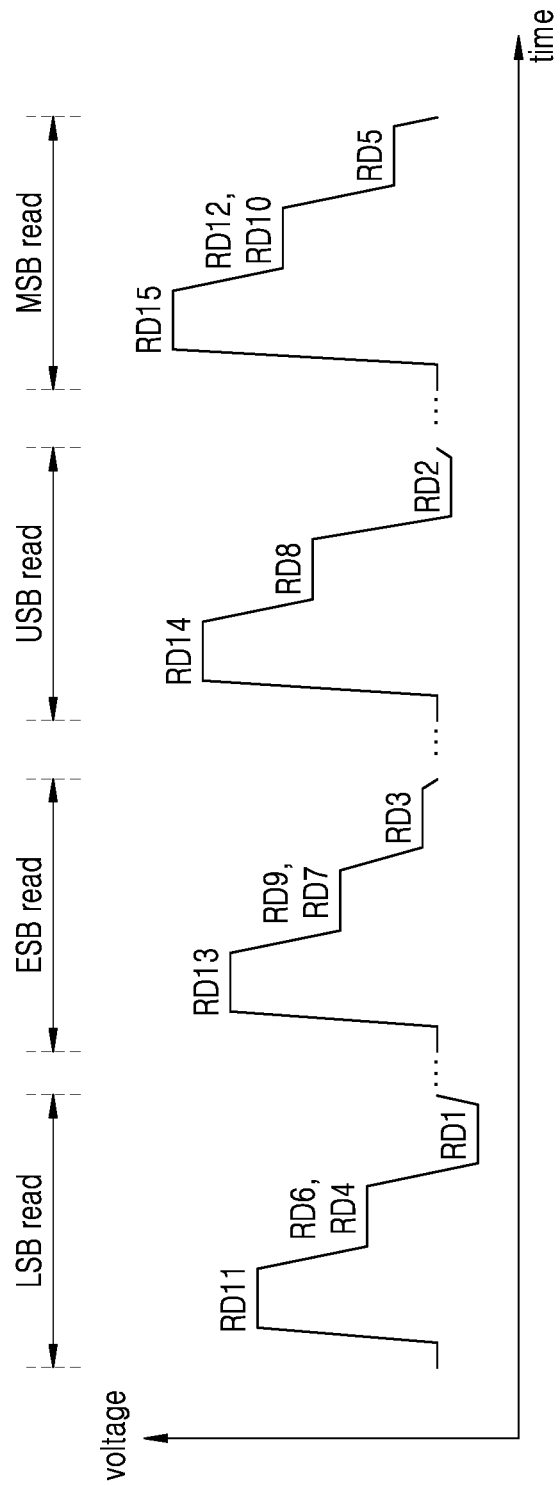
FIG. 13C is a diagram for describing a level of a read voltage according to an embodiment.
Figure 14:
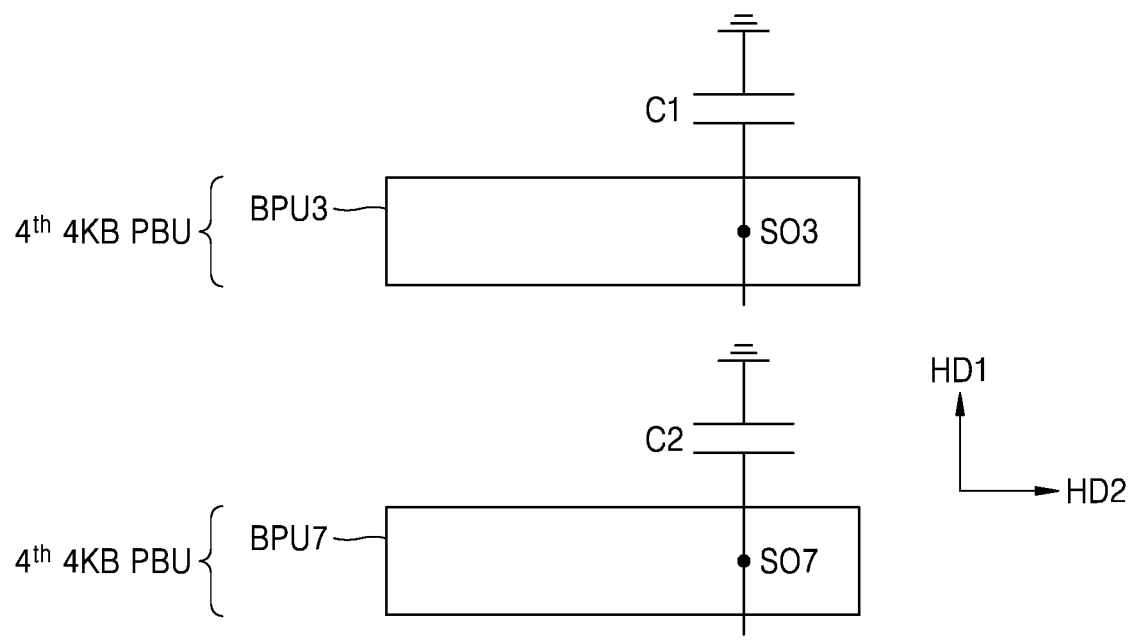
FIG. 14 is a diagram for describing capacitance according to connection between sensing nodes.

FIG. 12 is a circuit diagram illustrating the page buffer circuit 210a according to an embodiment. FIG. 13A is a timing diagram for describing a 4 KB read operation mode according to an embodiment. FIG. 13B is a timing diagram for describing a program state of a QLC program operation. FIG. 13C is a diagram for describing a level of a read voltage according to an embodiment. FIG. 14 is a diagram for describing capacitance according to connection between sensing nodes.

The page buffer circuit 210a of FIG. 12 may be substantially the same circuit as the page buffer circuit 210a of FIG. 10. The page buffer circuit 210a may include the first to eighth page buffer units PBU0 to PBU7 arranged in a multi-stage structure.

According to the read operation mode, only some of the first to eighth page buffer units PBU0 to PBU7 may operate as a selected page buffer unit, and two or more page buffer units may operate as unselected page buffer units.

For example, in a read operation mode for first 4 KB data among 16 KB data, the first and fifth page buffer units PBU0 and PBU4 may operate as selected page buffer units, and in a data read operation mode for second 4 KB data among 16 KB data, the second and sixth page buffer units PBU1 and PBU5 may operate as selected page buffer units, and in a read operation mode for third 4 KB data among 16 KB data, the third and seventh page buffer units PBU2 and PBU6 may operate as selected page buffer units, and in a read operation mode for fourth 4 KB data among 16 KB data, the fourth and eighth page buffer units PBU3 and PBU7 may operate as selected page buffer units. Although the 4 KB read operation mode will be mainly described later, a similar read operation mode may also be applied to an 8 KB read operation mode. For example, in a read operation mode for first 8 KB data among 16 KB data, the first, second, fifth and sixth page buffer units PBU0, PBU1, PBU4, and PBU5 may operate as selected page buffer units, and in a read operation mode for second 8 KB data among 16 KB data, the third, fourth, seventh, and eighth page buffer units PBU2, PBU3, PBU6, and PBU7 may operate as selected page buffer units.

In the 4 KB read operation mode, in addition to the page buffer units in the page buffer circuit 210a, page buffer units of another page buffer circuit may together operate as a selected page buffer unit, and the size of total data read from the selected page buffer units may be 4 KB.

Hereinafter, the read operation mode for the fourth 4 KB data among 16 KB data will be mainly described.

In the read operation mode for the fourth 4 KB data, the fourth and eighth page buffer units PBU3 and PBU7 may be selected page buffer units, and the first to third and fifth to seventh page buffer units PBU0 to PBU2 and PBU4 to PBU6 may be unselected page buffer units.

Referring to FIGS. 12 and 13A, according to an embodiment, a sensing node of a selected page buffer unit may be connected to a sensing node of an unselected page buffer unit. For example, the fourth sensing node SO3 may be connected to the first to third sensing nodes SO0 to SO2.

In detail, the first sensing node pass control signal SO_PASS0 and a second sensing node pass control signal SO_PASS'3 may be maintained at a low level at least in the sensing node precharge period 712, the developing period 713, and the sensing period 714 of the data sensing period 71.

In addition, first sensing node pass control signals SO_PASS1 to SO_PASS3 and second sensing node pass control signals SO_PASS'0 to SO_PASS'2 may be maintained at a high level at least in the sensing node precharge period 712, the developing period 713, and the sensing period 714 of the data sensing period 71.

Referring to FIG. 14, as the fourth sensing node SO3 is connected to the first to third sensing nodes SO0 to SO2, the capacitance of the fourth sensing node SO3 may increase to a first capacitance C1.

Similar to the fourth sensing node SO3, the eighth sensing node SO7 may be connected to the fifth to seventh sensing nodes SO4 to SO6.

In detail, a first sensing node pass control signal SO_PASS4 and a second sensing node pass control signal SO_PASS'7 may be maintained at a low level at least in the sensing node precharge period 712, the developing period 713, and the sensing period 714 of the data sensing period 71.

In addition, first sensing node pass control signals SO_PASS[7:5] and second sensing node pass control signals SO_PASS'4 to SO_PASS'6 may be maintained at a high level at least in the sensing node precharge period 712, the developing period 713, and the sensing period 714 of the data sensing period 71.

Referring to FIG. 14, as the eighth sensing node SO7 is connected to the fifth to seventh sensing nodes SO4 to SO6, the capacitance of the eighth sensing node SO7 may increase to a second capacitance C2.

As data sensed through the fourth sensing node SO3 and the eighth sensing node SO7 are all 4 KB data, the more the first capacitance C1 and the second capacitance C2 are similar, the reliability of the fourth 4 KB data may be increased.

The number of sensing nodes connected to the fourth sensing node SO3 and the number of sensing nodes connected to the eighth sensing node SO7 may be equal to each other so that the first capacitance C1 and the second capacitance C2 are similar, as shown in the example of FIG. 13A. In another example where the number of sensing nodes connected to the fourth sensing node SO3 and the eighth sensing node SO7 is equal to each other, unlike the illustration of FIG. 13A, the first and second sensing node pass control signals SO_PASS7, SO_PASS'6, SO_PASS3, and SO_PASS'2 may be activated so that the fourth sensing node SO3 is connected to only the third sensing node SO2 and the eighth sensing node SO7 is connected to only the seventh sensing node SO6.

Since the first and second pass transistors SO_PASS0 to SO_PASS7, SO_PASS'0 to SO_PASS'7 may also affect the first and second capacitances C1 and C2, in some embodiments, the number of turned-on pass transistors on a path connected to the fourth sensing node SO3 may be the same as the number of turned-on pass transistors on a path connected to the eighth sensing node SO7. For example, as the second pass transistor TR'3 is turned off, the fourth sensing node SO3 may not be connected to the fifth sensing node SO4 even if the first pass transistor TR4 is turned on. However, in order to set the first capacitance C1 and the second capacitance C2 to similar values, in response to the first pass transistor TR0 being turned off, the first pass transistor TR4 may also be turned off.

In some embodiments, in order to increase the second capacitance C2, the second pass transistor TR'7 is turned on, so that the eighth sensing node SO7 may also be connected to the precharge circuit SOC_PRE and the first to eighth cache units CU0 to CU7.

Referring to FIG. 13A, in some embodiments, a length of the developing period 713 may be adjusted, for example, the length of the developing period 713 may be shortened by being terminated by the first time t1.

According to an embodiment, the fourth and eighth sensing nodes SO3 and SO7 of the fourth and eighth page buffer units PBU3 and PBU7 may have increased capacitance, and thus, the magnitude of a cell current corresponding to the fourth and eighth sensing nodes SO3 and SO7 of the fourth and eighth page buffer units PBU3 and PBU7 may increase. As the magnitude of the cell current increases, by shortening the length of the developing period 713, a sufficient drop in an effective read voltage to distinguish other program states may be generated. That is, the effective read voltage may drop to evWL2, and by the effective read voltage evWL2, the first program state P1 and the second program state P2 may be distinguished. Therefore, the page buffer circuit may adjust the length of the developing period 713 by adjusting an activation timing of the set signal SET_S to T1, and by adjusting a number of sensing nodes of unselected page buffer units actively connected to the sensing node of the selected page buffer unit in order to speed up the decrease in voltage level at the sensing nodes.

According to an embodiment, by increasing the capacitance of the fourth and eighth sensing nodes SO3 and SO7 of the fourth and eighth page buffer units PBU3 and PBU7, a plurality of read operations may be performed while maintaining, based on the length of the developing period 713, a level of an actual read voltage applied to a word line.

In some embodiments, in the data sensing period 71, the bit line shut-off signal BLSHF may rise to a level Lv21, the bit line clamping signal BLCLAMP may rise to a level Lv22, and the bit line connection control signal CLBLK may rise to a level Lv23. Referring to FIGS. 11 and 13A, the level Lv21 may be higher than the level Lv11, and the level Lv22 may be higher than the level Lv12, and the level Lv23 may be higher than the level Lv13. That is, compared to the embodiment of FIG. 10, in the embodiment of FIG. 13A, a bit line may be precharged to a higher level. By precharging a bit line to a higher level, a maximum cell current may increase. As the maximum cell current increases, the deviation in the magnitudes of cell currents flowing through memory cells having various threshold voltages may increase. Due to the deviation in the magnitudes of the cell currents, by adjusting the length of the developing period 713, data of memory cells having various program states may be distinguished by a sensing latch.

Referring to FIG. 13B, during a QLC program operation, threshold voltages of memory cells may form first to sixteenth program states P1 to P16. One memory cell may store four bits. The four bits may be referred to as MSB, USB, ESB, and LSB, respectively. MSB may refer to a most significant bit, USB may refer to a next most significant bit, LSB may refer to a least significant bit, and ESB may refer to a next least significant bit. As illustrated in FIG. 13B, the plurality of program states may correspond to four different bit values.

Bit values corresponding to the first to sixteenth program states P1 to P16 may be distinguished based on first to fifteenth read voltages RD1 to RD15. For example, referring to FIG. 13B, LSB values may be distinguished based on the first, fourth, sixth, and eleventh read voltages RD1, RD4, RD6, and RD11, and ESB values may be distinguished based on the third, seventh, ninth, and thirteenth read voltages RD3, RD7, RD9, and RD13, and USB values may be distinguished based on the second, eighth, and fourteenth read voltages RD2, RD8, and RD14, and MSB values may be distinguished based on the fifth, tenth, twelfth, and fifteenth read voltages RD5, RD10, RD12, and RD15. In FIG. 13B, levels of the first to sixteenth read voltages RD1 to RD16 may be different from each other. That is, in order to read four bit values corresponding to the first to sixteenth program states P1 to P16, a read voltage level may need to be changed fifteen times.

Referring to FIG. 13C, according to an embodiment, at least two of the first to fifteenth read voltages RD1 to RD15 may have the same level. Hereinafter, description will focus on an LSB read operation, but the description of the LSB read operation may also be applied to an ESB read operation, a USB read operation, and an MSB read operation.

Unlike FIG. 13B, in FIG. 13C, the levels of the fourth and sixth read voltages RD4 and RD6 may be the same. For example, even when the read voltage level is the same, different program states may be distinguished by adjusting the length of a developing period. For example, a length of a developing period by the fourth read voltage RD4 may be shorter than a length of a developing period by the sixth read voltage RD6. In order to read an LSB bit, the level of the read voltage is changed four times in FIG. 13B, but the level of the read voltage is changed three times in FIG. 13C, and thus, the read time may be shortened. While the fourth read voltage RD4 and the sixth read voltage RD6 are illustrated as having the same level, the embodiments are not limited thereto, and among the first, fourth, sixth, and eleventh read voltages RD1, RD4, RD6, and RD11, at least two levels may be the same. Similarly, since the level of the read voltage is changed three times during an ESB read operation, the level of the read voltage is changed three times during a USB read operation, and the level of the read voltage is changed four times during an MSB read operation, in order to read four bit values corresponding to the first to sixteenth program states P1 to P16, the read voltage level may need to be changed twelve times. Accordingly, the read operation of FIG. 13C may provide a faster read speed than the read operation of FIG. 13B.

Figure 15:
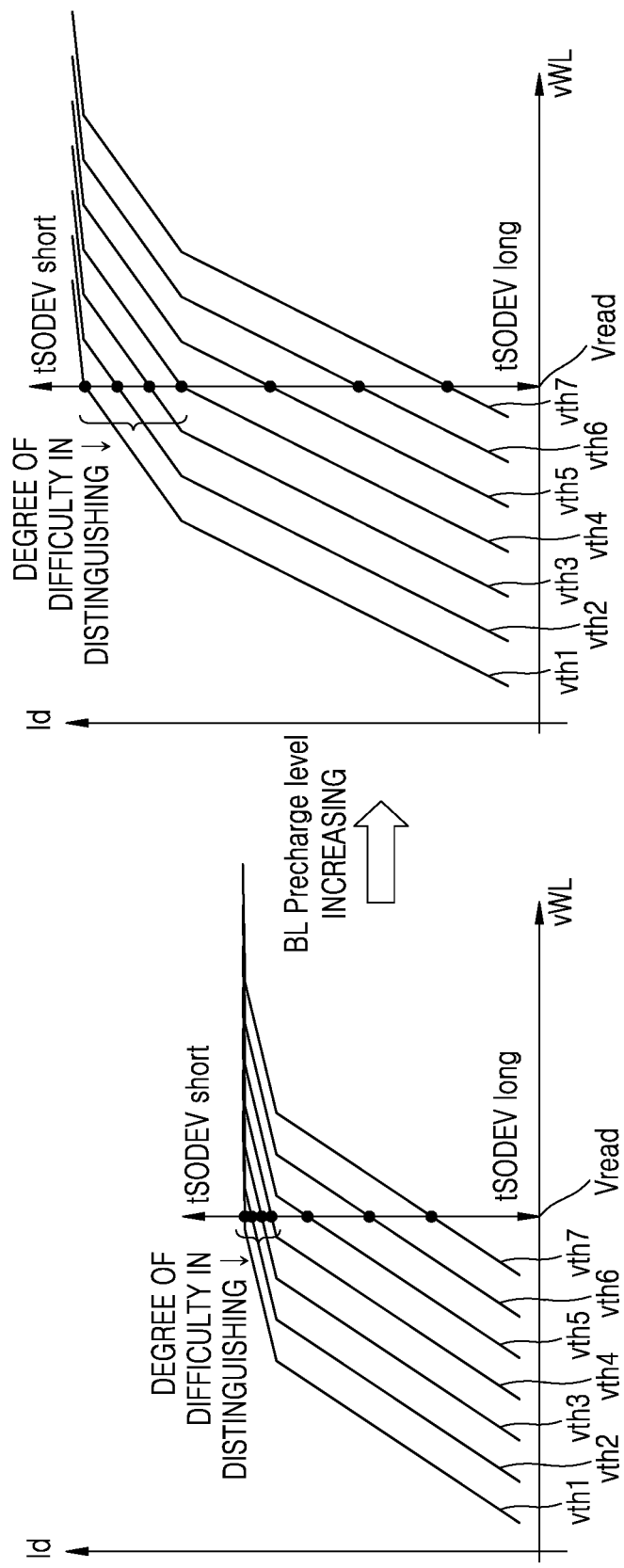
FIG. 15 is a diagram for describing threshold voltage sensing when a bit line precharge level is changed.

FIG. 15 is a diagram for explaining threshold voltage sensing when a bit line precharge level is changed. A diagram on the left of FIG. 15 describes a word line voltage vWL and a drain current Id for each threshold voltage when the bit line shut-off signal BLSHF rises to the level Lv11, the bit line clamping signal BLCLAMP rises to the level Lv12, and the bit line connection control signal CLBLK rises to the level Lv13, as described above with reference to FIG. 11.

A diagram on the right of FIG. 15 describes a word line voltage vWL and a drain current Id for each threshold voltage when the bit line shut-off signal BLSHF rises to the level Lv21, the bit line clamping signal BLCLAMP rises to the level Lv22, and the bit line connection control signal CLBLK rises to the level Lv23, as described above with reference to FIG. 13A.

Referring to the diagram on the left of FIG. 15, a read voltage Vread may be applied to a word line during a read operation, and data of a memory cell having first to seventh threshold voltages vth1 to vth7 may be sensed according to a develop time tSODEV. In detail, the shorter the develop time tSODEV, data of a memory cell having a lower threshold voltage may be sensed, and accordingly, an effective read voltage may drop. The longer the develop time tSODEV increases, data of a memory cell having a higher threshold voltage may be sensed. However, depending on a relationship between the word line voltage vWL and the drain current Id, the shorter the develop time tSODEV, the less the deviation in the drain current Id flowing through the memory cells having various threshold voltages vth1 to vth7. Accordingly, the deviation in the sensing node SO due to the drain current Id is also reduced, and it may be difficult to distinguish data stored in memory cells having various threshold voltages.

Referring to the diagram on the right of FIG. 15, a read voltage Vread may be applied to a word line during a read operation, and data of memory cells having the first to seventh threshold voltages vth1 to vth7 may be sensed according to the develop time tSODEV. Compared with the diagram on the left of FIG. 15, as the bit line pre-charge level is increased, a maximum value of the drain current Id flowing through each memory cell may also increase. Accordingly, even when the develop time tSODEV is shortened, the deviation in the drain currents Id flowing through the memory cells having the first to seventh threshold voltages vth1 to vth7 is relatively large, and thus, the deviation in the level of the sensing nodes SO due to the drain currents Id may also increase. Accordingly, data stored in memory cells having various threshold voltages may be relatively easily distinguished through a sensing latch.

Figure 16:
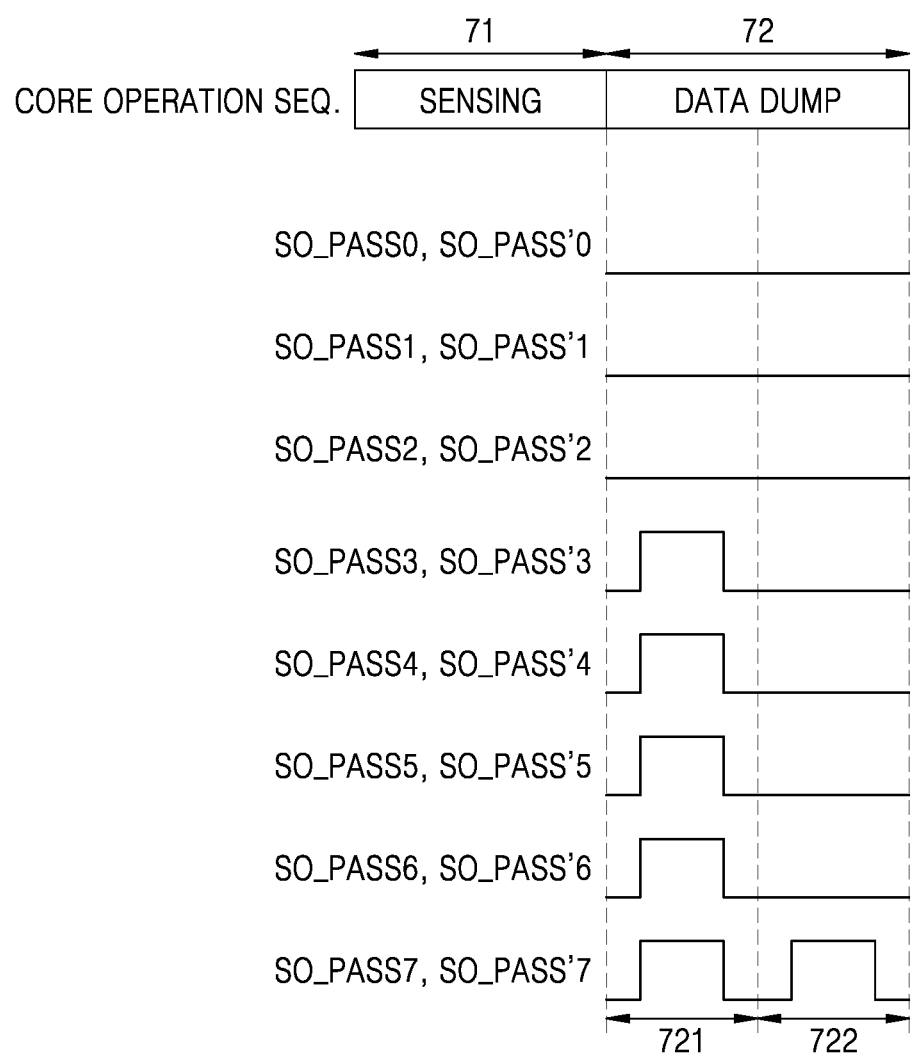
FIG. 16 is a timing diagram illustrating voltage levels of a plurality of sensing node pass control signals according to a core operation sequence, according to an embodiment.

FIG. 16 is a timing diagram illustrating voltage levels of a plurality of sensing node pass control signals S0_PASS [7:0], SO_PASS'[7:0] according to a core operation sequence, according to an embodiment.

Referring to FIGS. 13A and 16 together, the core operation sequence may include a data sensing period 71 in which a data sensing operation is performed and a data dumping period or a data transfer period 72 in which a data dumping operation is performed. FIG. 16 illustrates the data transfer period 72 in a read operation mode for the fourth 4 KB data among 16 KB data.

Referring to FIGS. 12 and 13, through the data sensing period 71, read data may be stored in one of main latches of the fourth page buffer unit PBU3 and the eighth page buffer unit PBU7 (the sensing latch SL, the force latch FL, the higher bit latch ML, the lower bit latch LL of FIG. 6).

In the data transfer period 72, in order to individually control connection between the first to eighth page buffer units PBU0 to PBU7 and the first to eighth cache units CU0 to CU7, the first and second pass transistors TR0 to TR7 and TR'0 to TR'7 included in each of the first to eighth page buffer units PBU0 to PBU7 may be selectively turned on. That is, a pass transistor located on a data path between the main latch and a corresponding cache unit may be turned on.

In detail, in a first data transfer period 721, first sensing node pass control signals SO_PASS[2:0] and second sensing node pass control signals SO_PASS'[2:0] may be deactivated, and first sensing node pass control signals SO_PASS [7:3] and second sensing node pass control signals SO_PASS'[7:3] may be activated. Accordingly, the first and second pass transistors TR3 to TR7 and TR'3 to TR'7 included in each of the fourth to eighth page buffer units PBU3 to PBU7 may be turned on and connected in series. Here, the fourth sensing node SO3 may be connected to the coupling sensing node SOC through the fifth to eighth sensing nodes SO4 to SO7, and data dumping may be performed between the main latch included in the fourth page buffer unit PBU3 (e.g., one of the sensing latch SL, the force latch FL, the higher bit latch ML, and the lower bit latch LL of FIG. 6) and the cache latch in the fourth cache unit CU4 (e.g., the cache latch CL of FIG. 6).

In a second data transfer period 722, first sensing node pass control signals SO_PASS[6:0] and second sensing node pass control signals SO_PASS'[6:0] may be deactivated, and a first sensing node pass control signal SO_PASS7 and a second sensing node pass control signal SO_PASS'7 may be activated. Accordingly, all of the first and second pass transistors TR7 and TR'7 included in the eighth page buffer unit PBU7 may be turned on and connected in series. Here, the eighth sensing node SO7 may be connected to the coupling sensing node SOC, and data dumping may be performed between the main latch included in the eighth page buffer unit pBU7 (e.g., one of the sensing latch SL, the force latch FL, the higher bit latch ML, and the lower bit latch LL of FIG. 6) and the cache latch in the eighth cache unit CU7 (e.g., the cache latch CL of FIG. 6).

The amount of current consumed in the data transfer period 72 may be reduced by activating only a pass transistor located on a path between a page buffer unit that is subject to data dumping, and a cache unit.

Figure 17:
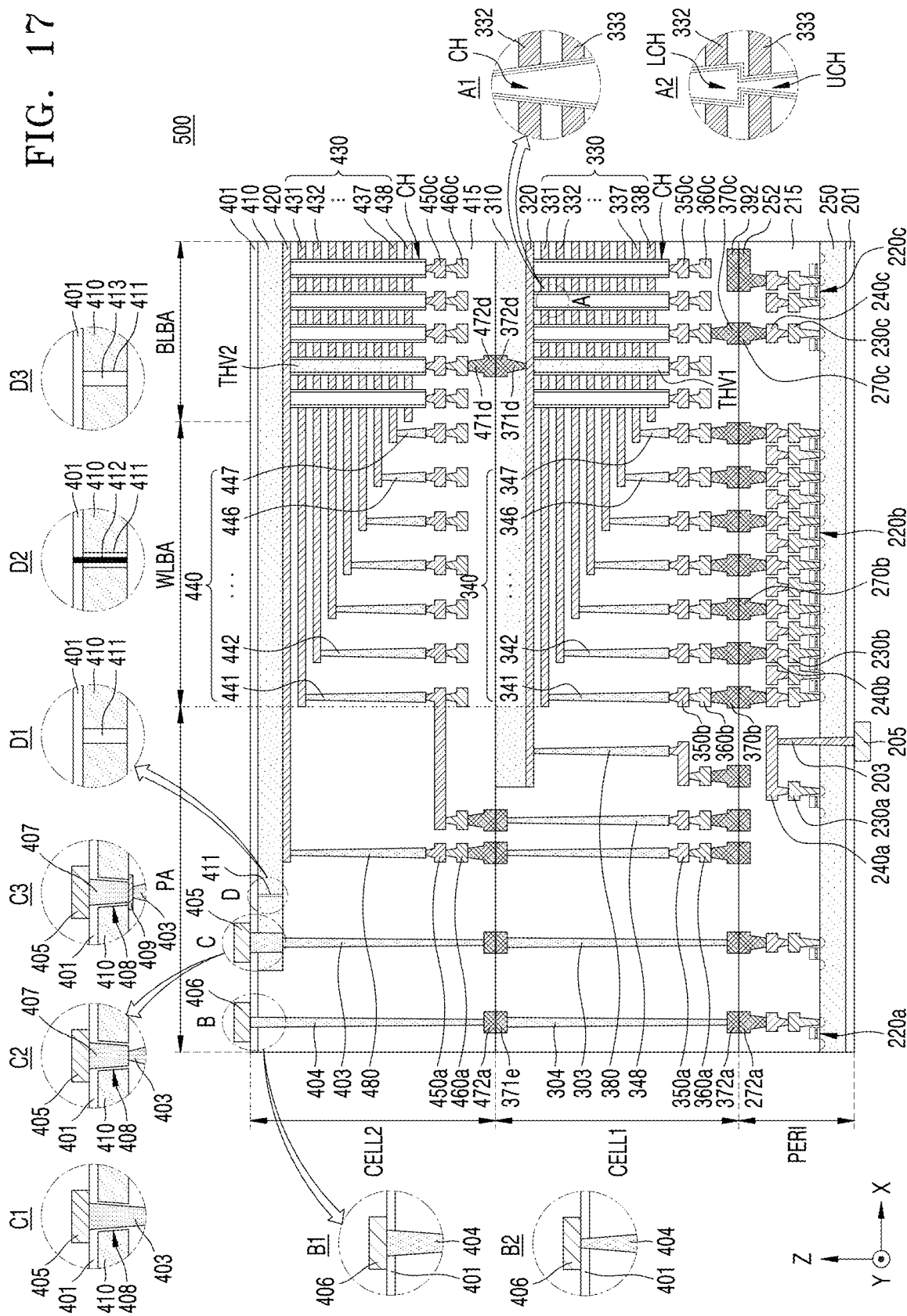
FIG. 17 is a diagram for describing a memory device according to an embodiment.

FIG. 17 is a view illustrating a memory device 500 according to some embodiments of the inventive concept.

Referring to FIG. 17, the memory device 500 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 500 may include the at least one upper chip including the cell region. For example, as illustrated in FIG. 17, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a -Z-axis direction in FIG. 17. However, embodiments of the inventive concepts are not limited thereto. In certain embodiments, one of the first upper chip and the second upper chip may be turned over and then may be connected to a corresponding chip by the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 250 and a plurality of circuit elements 220a, 220b and 220c formed on the first substrate 250. An interlayer insulating layer 215 including one or more insulating layers may be provided on the plurality of circuit elements 220a, 220b and 220c, and a plurality of metal lines electrically connected to the plurality of circuit elements 220a, 220b and 220c may be provided in the interlayer insulating layer 215. For example, the plurality of metal lines may include first metal lines 230a, 230b and 230c connected to the plurality of circuit elements 220a, 220b and 220c, and second metal lines 240a, 240b and 240c formed on the first metal lines 230a, 230b and 230c. The plurality of metal lines may be formed of at least one of various conductive materials. For example, the first metal lines 230a, 230b and 230c may be formed of tungsten having a relatively high electrical resistivity, and the second metal lines 240a, 240b and 240c may be formed of copper having a relatively low electrical resistivity.

The first metal lines 230a, 230b and 230c and the second metal lines 240a, 240b and 240c are illustrated and described in the present embodiments. However, embodiments of the inventive concepts are not limited thereto. In certain embodiments, at least one or more additional metal lines may further be formed on the second metal lines 240a, 240b and 240c. In this case, the second metal lines 240a, 240b and 240c may be formed of aluminum, and at least some of the additional metal lines formed on the second metal lines 240a, 240b and 240c may be formed of copper having an electrical resistivity lower than that of aluminum of the second metal lines 240a, 240b and 240c.

The interlayer insulating layer 215 may be disposed on the first substrate 250 and may include or be formed of an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 to 338) may be stacked on the second substrate 310 in a direction (i.e., the Z-axis direction) perpendicular to a top surface of the second substrate 310. String selection lines and a ground selection line may be disposed on and under the word lines 330, and the plurality of word lines 330 may be disposed between the string selection lines and the ground selection line. Likewise, the second cell region CELL2 may include a third substrate 410 and a common source line 420, and a plurality of word lines 430 (431 to 438) may be stacked on the third substrate 410 in a direction (i.e., the Z-axis direction) perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in a region 'A1', the channel structure CH may be provided in the bit line bonding region BLBA and may extend in the direction perpendicular to the top surface of the second substrate 310 to penetrate the word lines 330, the string selection lines, and the ground selection line. The channel structure CH may include a data storage layer, a channel layer, and a filling insulation layer. The channel layer may be electrically connected to a first metal line 350c and a second metal line 360c in the bit line bonding region BLBA. For example, the second metal line 360c may be a bit line and may be connected to the channel structure CH through the first metal line 350c. The bit line 360c may extend in a first direction (e.g., a Y-axis direction) parallel to the top surface of the second substrate 310.

In some embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 310 to penetrate the common source line 320 and lower word lines 331 and 332. The lower channel LCH may include a data storage layer, a channel layer, and a filling insulation layer and may be connected to the upper channel UCH. The upper channel UCH may penetrate upper word lines 333 to 338. The upper channel UCH may include a data storage layer, a channel layer, and a filling insulation layer, and the channel layer of the upper channel UCH may be electrically connected to the first metal line 350c and the second metal line 360c. As a length of a channel increases, due to characteristics of manufacturing processes, it may be difficult to form a channel having a substantially uniform width. The memory device 500 according to the present embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 332 and 333 adjacent to the boundary between the lower channel LCH and the upper channel UCH may be the dummy word lines. In this case, data may not be stored in memory cells connected to the dummy word line. Alternatively, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 331 and 332 penetrated by the lower channel LCH is less than the number of the upper word lines 333 to 338 penetrated by the upper channel UCH in the region 'A2'. However, embodiments of the inventive concepts are not limited thereto. In certain embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 17, the first through-electrode THV1 may penetrate the common source line 320 and the plurality of word lines 330. In certain embodiments, the first through-electrode THV1 may further penetrate the second substrate 310. The first through-electrode THV1 may include or be formed of a conductive material. Alternatively, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 372*d* and a second through-metal pattern 472*d*. The first through-metal pattern 372*d* may be formed at a bottom end of the first upper chip including the first cell region CELL1, and the second through-metal pattern 472*d* may be formed at a top end of the second upper chip including the second cell region CELL2. The first through-electrode THV1 may be electrically connected to the first metal line 350*c* and the second metal line 360*c*. A lower via 371*d* may be formed between the first through-electrode THV1 and the first through-metal pattern 372*d*, and an upper via 471*d* may be formed between the second through-electrode THV2 and the second through-metal pattern 472*d*. The first through-metal pattern 372*d* and the second through-metal pattern 472*d* may be connected to each other by the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit line bonding region BLBA, the bit line 360*c* may be electrically connected to a page buffer included in the peripheral circuit region PERI. For example, some of the circuit elements 220*c* of the peripheral circuit region PERI may constitute the page buffer, and the bit line 360*c* may be electrically connected to the circuit elements 220*c* constituting the page buffer through an upper bonding metal pattern 370*c* of the first cell region CELL1 and an upper bonding metal pattern 270*c* of the peripheral circuit region PERI.

Referring continuously to FIG. 17, in the word line bonding region WLBA, the word lines 330 of the first cell region CELL1 may extend in a second direction (e.g., an X-axis direction) parallel to the top surface of the second substrate 310 and may be connected to a plurality of cell contact plugs 340 (341 to 347). First metal lines 350*b* and second metal lines 360*b* may be sequentially connected onto the cell contact plugs 340 connected to the word lines 330. In the word line bonding region WLBA, the cell contact plugs 340 may be connected to the peripheral circuit region PERI through upper bonding metal patterns 370*b* of the first cell region CELL1 and upper bonding metal patterns 270*b* of the peripheral circuit region PERI.

The cell contact plugs 340 may be electrically connected to a row decoder included in the peripheral circuit region PERI. For example, some of the circuit elements 220*b* of the peripheral circuit region PERI may constitute the row decoder, and the cell contact plugs 340 may be electrically connected to the circuit elements 220*b* constituting the row decoder through the upper bonding metal patterns 370*b* of the first cell region CELL1 and the upper bonding metal patterns 270*b* of the peripheral circuit region PERI. In some embodiments, an operating voltage of the circuit elements 220*b* constituting the row decoder may be different from an operating voltage of the circuit elements 220*c* constituting the page buffer. For example, the operating voltage of the circuit elements 220*c* constituting the page buffer may be greater than the operating voltage of the circuit elements 220*b* constituting the row decoder.

Likewise, in the word line bonding region WLBA, the word lines 430 of the second cell region CELL2 may extend in the second direction (e.g., the X-axis direction) parallel to the top surface of the third substrate 410 and may be connected to a plurality of cell contact plugs 440 (441 to 447). The cell contact plugs 440 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 370*b* may be formed in the first cell region CELL1, and the upper bonding metal patterns 270*b* may be formed in the peripheral circuit region PERI. The upper bonding metal patterns 370*b* of the first cell region CELL1 and the upper bonding metal patterns 270*b* of the peripheral circuit region PERI may be electrically connected to each other by the bonding method. The upper bonding metal patterns 370*b* and the upper bonding metal patterns 270*b* may be formed of aluminum, copper, or tungsten.

In the external pad bonding region PA, a lower metal pattern 371*e* may be formed in a lower portion of the first cell region CELL1, and an upper metal pattern 472*a* may be formed in an upper portion of the second cell region CELL2. The lower metal pattern 371*e* of the first cell region CELL1 and the upper metal pattern 472*a* of the second cell region CELL2 may be connected to each other by the bonding method in the external pad bonding region PA. Likewise, an upper metal pattern 372*a* may be formed in an upper portion of the first cell region CELL1, and an upper metal pattern 272*a* may be formed in an upper portion of the peripheral circuit region PERI. The upper metal pattern 372*a* of the first cell region CELL1 and the upper metal pattern 272*a* of the peripheral circuit region PERI may be connected to each other by the bonding method.

Common source line contact plugs 380 and 480 may be disposed in the external pad bonding region PA. The common source line contact plugs 380 and 480 may be formed of a conductive material such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405 and 406 may be disposed in the external pad bonding region PA. Referring to FIG. 17, a lower insulating layer 201 may cover a bottom surface of the first substrate 250, and a first input/output pad 205 may be formed on the lower insulating layer 201. The first input/output pad 205 may be connected to at least one of a plurality of the circuit elements 220a disposed in the peripheral circuit region PERI through a first input/output contact plug 203 and may be separated from the first substrate 250 by the lower insulating layer 201. In addition, a side insulating layer may be disposed between the first input/output contact plug 203 and the first substrate 250 to electrically isolate the first input/output contact plug 203 from the first substrate 250.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220a disposed in the peripheral circuit region PERI through second input/output contact plugs 403 and 303, and the third input/output pad 406 may be connected to at least one of the plurality of circuit elements 220a disposed in the peripheral circuit region PERI through third input/output contact plugs 404 and 304.

In some embodiments, the third substrate 410 may not be disposed in a region in which the input/output contact plug is disposed. For example, as illustrated in a region 'B', the third input/output contact plug 404 may be separated from the third substrate 410 in a direction parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In some embodiments, as illustrated in a region 'B1', the third input/output contact plug 404 may extend in a third direction (e.g., the Z-axis direction), and a diameter of the third input/output contact plug 404 may become progressively greater toward the upper insulating layer 401. In other words, a diameter of the channel structure CH described in the region 'A1' may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In certain embodiments, as illustrated in a region 'B2', the third input/output contact plug 404 may extend in the third direction (e.g., the Z-axis direction), and a diameter of the third input/output contact plug 404 may become progressively less toward the upper insulating layer 401. In other words, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In certain embodiments, the input/output contact plug may overlap with the third substrate 410. For example, as illustrated in a region 'C', the second input/output contact plug 403 may penetrate the interlayer insulating layer 415 of the second cell region CELL2 in the third direction (e.g., the Z-axis direction) and may be electrically connected to the second input/output pad 405 through the third substrate 410. In this case, a connection structure of the second input/output contact plug 403 and the second input/output pad 405 may be realized by various methods.

In some embodiments, as illustrated in a region 'C1', an opening 408 may be formed to penetrate the third substrate 410, and the second input/output contact plug 403 may be connected directly to the second input/output pad 405 through the opening 408 formed in the third substrate 410. In this case, as illustrated in the region 'C1', a diameter of the second input/output contact plug 403 may become progressively greater toward the second input/output pad 405. However, embodiments of the inventive concepts are not limited thereto, and in certain embodiments, the diameter of the second input/output contact plug 403 may become progressively less toward the second input/output pad 405.

In certain embodiments, as illustrated in a region 'C2', the opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Thus, the second input/output contact plug 403 may be electrically connected to the second input/output pad 405 through the contact 407 in the opening 408. In this case, as illustrated in the region 'C2', a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In certain embodiments illustrated in a region 'C3', a stopper 409 may further be formed on a bottom end of the opening 408 of the third substrate 410, as compared with the embodiments of the region 'C2'. The stopper 409 may be a metal line formed in the same layer as the common source line 420. Alternatively, the stopper 409 may be a metal line formed in the same layer as at least one of the word lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371e or may become progressively greater toward the lower metal pattern 371e.

Meanwhile, in some embodiments, a slit 411 may be formed in the third substrate 410. For example, the slit 411 may be formed at a certain position of the external pad bonding region PA. For example, as illustrated in a region 'D', the slit 411 may be located between the second input/output pad 405 and the cell contact plugs 440 when viewed in a plan view. Alternatively, the second input/output pad 405 may be located between the slit 411 and the cell contact plugs 440 when viewed in a plan view.

In some embodiments, as illustrated in a region 'D1', the slit 411 may be formed to penetrate the third substrate 410. For example, the slit 411 may be used to prevent the third substrate 410 from being finely cracked when the opening 408 is formed. However, embodiments of the inventive concepts are not limited thereto, and in certain embodiments, the slit 411 may be formed to have a depth ranging from about 60% to about 70% of a thickness of the third substrate 410.

In certain embodiments, as illustrated in a region 'D2', a conductive material 412 may be formed in the slit 411. For example, the conductive material 412 may be used to discharge a leakage current occurring in driving of the circuit elements in the external pad bonding region PA to the outside. In this case, the conductive material 412 may be connected to an external ground line.

In certain embodiments, as illustrated in a region 'D3', an insulating material 413 may be formed in the slit 411. For example, the insulating material 413 may be used to electrically isolate the second input/output pad 405 and the second input/output contact plug 403 disposed in the external pad bonding region PA from the word line bonding region WLBA. Since the insulating material 413 is formed in the slit 411, it is possible to prevent a voltage provided through the second input/output pad 405 from affecting a metal layer disposed on the third substrate 410 in the word line bonding region WLBA.

In certain embodiments, the first to third input/output pads 205, 405 and 406 may be selectively formed. For example, the memory device 500 may be realized to include only the first input/output pad 205 disposed on the first substrate 250, to include only the second input/output pad 405 disposed on the third substrate 410, or to include only the third input/output pad 406 disposed on the upper insulating layer 401.

In some embodiments, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering a top surface of the common source line 320 or a conductive layer for connection may be formed. Likewise, the third substrate 410 of the second cell region CELL2 may be removed before or after the bonding process of the first cell region CELL1 and the second cell region CELL2, and then, the upper insulating layer 401 covering a top surface of the common source line 420 or a conductive layer for connection may be formed.

The memory cell array 100 of FIGS. 1 and 5 may be disposed in the first cell region CELL1 and/or the second cell region CELL2. The peripheral circuit 200 of FIG. 1 may be disposed in the peripheral region PERI.

Figure 18:
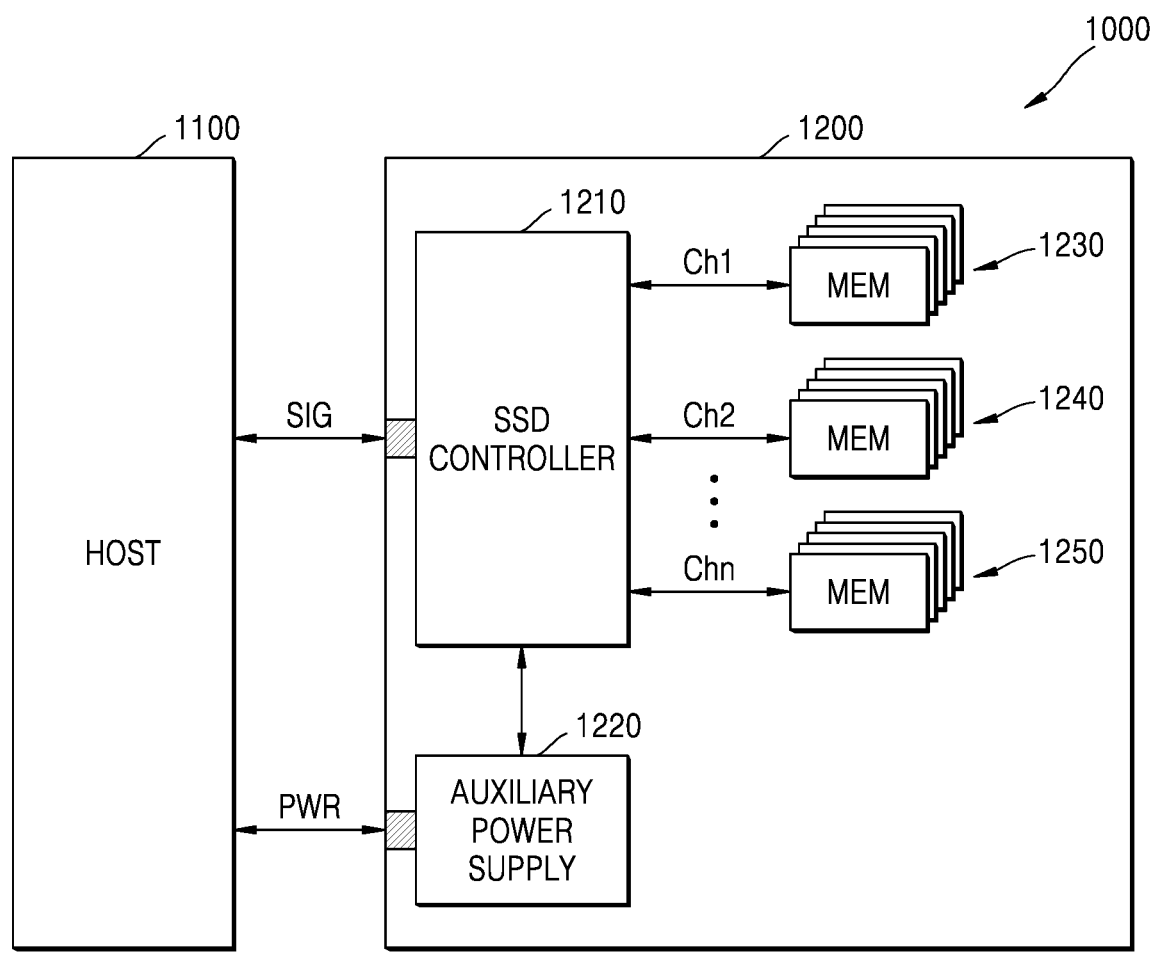
FIG. 18 is a block diagram illustrating an example of a memory device applied to a solid state drive (SSD) system, according to embodiments.

FIG. 18 is a block diagram illustrating an example of a memory device applied to a solid state drive (SSD) system 1000, according to embodiments. Referring to FIG. 18, the SSD system 1000 may include a host 1100 and an SSD 1200. The SSD 1200 transmits and receives signals to and from the host 1100 through a signal connector, and receives power through a power connector. The SSD 1200 may include an SSD controller 1210, an auxiliary power supply 1220, and memory devices 1230, 1240, and 1250. The memory devices 1230, 1240, and 1250 may be vertically stacked NAND flash memory devices. The SSD 1200 may be implemented using the embodiments described above with reference to FIGS. 1 to 17. For example, the memory device 10 of FIG. 1 may be used to implement the memory devices 1230, 1240, and 1250 of FIG. 18.

While the inventive concept has been particularly shown and described with reference to embodiments thereof, it will be understood that various changes in form and details may be made therein without departing from the spirit and scope of the following claims.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

What is claimed is:

1. A memory device comprising:
   a memory cell array comprising a plurality of memory cells; and
   a page buffer circuit comprising a plurality of page buffer units respectively connected to the plurality of memory cells via a plurality of bit lines, and a plurality of cache latches respectively corresponding to the plurality of page buffer units,
   wherein each of the plurality of page buffer units comprises a pass transistor that is connected to a corresponding sensing node and is driven according to a pass control signal, and
   wherein the memory device is configured such that in a data sensing period, a sensing node of a selected page buffer unit among the plurality of page buffer units is actively connected to a sensing node of an unselected page buffer unit among the plurality of page buffer units.

2. The memory device of claim 1, wherein a pass transistor included in the selected page buffer unit and a pass transistor included in the unselected page buffer unit are connected to each other in series, wherein the memory device is configured such that in the data sensing period, the sensing node of the selected page buffer unit and the sensing node of the unselected page buffer unit are actively connected to each other by turning each pass transistor on.

3. The memory device of claim 1, configured such that:
   the selected page buffer unit senses, in the data sensing period, data stored in at least one memory cell among memory cells connected to a word line, and
   the unselected page buffer unit does not sense, in the data sensing period, data stored in the memory cells connected to the word line.

4. The memory device of claim 1, wherein the page buffer circuit is configured to perform a plurality of read operations including a developing period in which the sensing node of each selected page buffer unit is connected to a bit line of the selected page buffer unit, and identify at least three of threshold voltage distributions formed by the plurality of memory cells, by adjusting a length of the developing period for each of the plurality of read operations.

5. The memory device of claim 4, wherein each of the plurality of page buffer units comprises a sensing latch configured to sense data stored in a corresponding memory cell, based on a level of the sensing node and a reference level, when a set signal is activated, and the page buffer circuit is configured to adjust the length of the developing period by adjusting an activation timing of the set signal and by adjusting a number of sensing nodes of unselected page buffer units actively connected to the sensing node of the selected page buffer unit.

6. The memory device of claim 4, wherein, among the plurality of read operations, a magnitude of a read voltage applied to a word line connected to the plurality of memory cells is constant.

7. The memory device of claim 4, wherein the page buffer circuit is further configured to precharge the plurality of bit lines to a first level if all of the plurality of page buffer units are the selected page buffer unit, and precharge the plurality of bit lines to a second level if some of the plurality of page buffer units are the selected page buffer unit and others of the plurality of page buffer units are the unselected page buffer unit, and the second level is greater than the first level.

8. The memory device of claim 1, configured such that, in the data sensing period, a number of sensing nodes of unselected page buffer units to which a sensing node of a first selected page buffer unit is actively connected from among the plurality of page buffer units is equal to a number of sensing nodes of unselected page buffer units to which a sensing node of a second selected page buffer unit is actively connected from among the plurality of page buffer units.

9. The memory device of claim 1, configured such that, when page buffer units adjacent to the plurality of cache latches among the plurality of page buffer units are the selected page buffer units, in the data sensing period, the selected page buffer units and the plurality of cache latches are electrically insulated from each other.

10. The memory device of claim 1, wherein the selected page buffer unit includes a main latch storing data stored in at least one memory cell among the plurality of memory cells, and configured such that in a data transfer period, at least one pass transistor located on a data path between the main latch and a cache latch corresponding to the selected page buffer unit is turned on.

11. A memory device comprising:
a memory cell array comprising a plurality of memory cells; and
a page buffer circuit comprising N page buffer units connected to the plurality of memory cells via N respective bit lines, wherein N is a natural number less than or equal to 8, and N cache latches respectively corresponding to the N page buffer units,
wherein the memory device is configured such that, in a data sensing period, a sensing node of a first page buffer unit sensing data stored in at least one memory cell among the plurality of memory cells among the N page buffer units is actively electrically connected to a sensing node of at least a second page buffer unit other than the first page buffer unit among the N page buffer units.

12. The memory device of claim 11, wherein each of the N page buffer units comprises a pass transistor that is connected to a corresponding sensing node and is driven according to a pass control signal, and
wherein the memory device is configured such that in the data sensing period, a pass transistor included in the first page buffer unit and a pass transistor included in the second page buffer unit are actively connected to each other in series.

13. The memory device of claim 12, wherein the first page buffer unit includes a main latch storing data stored in the at least one memory cell, and
wherein the memory device is configured such that in a data transfer period, at least one pass transistor located on a data path between the main latch and a first cache latch corresponding to the first page buffer unit is turned on.

14. The memory device of claim 11, wherein the page buffer circuit is further configured to precharge each of the N bit lines to a first level if all of the N page buffer units are the first page buffer unit, and precharge each of the N bit lines to a second level if some of the N page buffer units are the first page buffer unit and the others of the N page buffer units are the second page buffer unit, and
the second level is greater than the first level.

15. The memory device of claim 11, wherein the page buffer circuit is further configured to perform a plurality of read operations including a developing period in which the sensing node of each first page buffer unit is connected to a corresponding bit line of each first page buffer unit, and identify at least three threshold voltage distributions formed by the plurality of memory cells, by adjusting a length of the developing period for each of the plurality of read operations.

16. The memory device of claim 15, wherein the first page buffer unit comprises a sensing latch configured to sense data stored in a corresponding memory cell, based on a level of the sensing node and a reference level, when a set signal is activated, and
the page buffer circuit is configured to adjust a length of the developing period by adjusting an activation timing of the set signal.

17. A memory device comprising:
a memory cell region comprising a plurality of memory cells and a first metal pad; and
a peripheral circuit region comprising a second metal pad and being vertically connected to the memory cell region through the first metal pad and the second metal pad,
wherein the peripheral circuit region comprises a page buffer circuit comprising a plurality of page buffer units arranged in a first horizontal direction and respectively connected to the plurality of memory cells via a plurality of bit lines, and a plurality of cache latches arranged in the first horizontal direction and respectively corresponding to the plurality of page buffer units,
wherein the memory device is configured such that, in a data sensing period, a sensing node of a first page buffer unit sensing data stored in at least one memory cell among the plurality of memory cells among the plurality of page buffer units is actively electrically connected to a sensing node of at least a second page buffer unit from among the plurality of page buffer units.

18. The memory device of claim 17, wherein each of the plurality of page buffer units comprises a pass transistor that is connected to a corresponding sensing node and is driven according to a pass control signal, and
wherein the memory device is configured such that in the data sensing period, a pass transistor included in the first page buffer unit and a pass transistor included in the second page buffer unit are connected to each other in series.

19. The memory device of claim 17, configured such that, in the data sensing period, a sensing node of a third page buffer unit sensing data stored in at least one memory cell among the plurality of memory cells among the plurality of page buffer units is electrically connected to a sensing node of at least a fourth page buffer unit among the plurality of page buffer units, and a number of sensing nodes of page buffer units to which the sensing node of the first page buffer unit is connected is equal to a number of sensing nodes of page buffer units to which the sensing node of the third page buffer unit is connected.

20. The memory device of claim 17, wherein the page buffer circuit is configured to identify at least three of threshold voltage distributions formed by the plurality of memory cells by adjusting a length of a developing period in which the sensing node of the first page buffer unit is connected to a bit line of the first page buffer unit for each of a plurality of read operations, and wherein the memory device is configured such that during the plurality of read operations, a magnitude of a read voltage applied to a word line connected to the plurality of memory cells is constant.

* * * * *